(12) United States Patent
Lopez et al.

(10) Patent No.: US 8,783,439 B2
(45) Date of Patent: Jul. 22, 2014

(54) METHOD AND MACHINE FOR PREPARING STOPPERS, CAPS, OR OTHER TYPES OF OBJECTS

(75) Inventors: Remy Lopez, Octeville-sur-Mer (FR);
Zmaj Petrovic, Octeville-sur-Mer (FR);
David Lamoly, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 6 days.

(21) Appl. No.: 13/807,557

(22) PCT Filed: May 11, 2011

(86) PCT No.: PCT/FR2011/051057
§ 371 (c)(1),
(2), (4) Date: Dec. 28, 2012

(87) PCT Pub. No.: WO2012/001252
PCT Pub. Date: Jan. 5, 2012

(65) Prior Publication Data
US 2013/0098737 A1     Apr. 25, 2013

(30) Foreign Application Priority Data
Jun. 29, 2010 (FR) ..................................... 10 55201

(51) Int. Cl.
*B65G 47/12*     (2006.01)
(52) U.S. Cl.
USPC .................................................... 198/397.01
(58) Field of Classification Search
CPC ............................. B65G 47/12; B65G 47/256
USPC ........................................... 198/396, 397.01
See application file for complete search history.

(56) References Cited

U.S. PATENT DOCUMENTS

| | | | | | |
|---|---|---|---|---|---|
| 2,609,912 | A | * | 9/1952 | Engel | 198/397.06 |
| 2,745,537 | A | * | 5/1956 | Cadman | 198/397.01 |
| 3,070,210 | A | * | 12/1962 | Woodward, Jr. | 198/397.01 |
| 3,942,541 | A | * | 3/1976 | Dupuy | 453/56 |
| 4,735,343 | A | * | 4/1988 | Herzog | 221/159 |
| 7,040,489 | B2 | * | 5/2006 | Zemlin et al. | 209/691 |
| 7,972,088 | B2 | * | 7/2011 | Dotson et al. | 406/79 |
| 2013/0098812 | A1 | * | 4/2013 | Lopez et al. | 209/617 |

* cited by examiner

FOREIGN PATENT DOCUMENTS

DE         15 56 588 A1     1/1970

OTHER PUBLICATIONS

French Preliminary Search Report for FR 10 55201 dated Mar. 8, 2011.

*Primary Examiner* — Leslie A Nicholson, III
*Assistant Examiner* — Keith R Campbell
(74) *Attorney, Agent, or Firm* — Sughrue Mion, PLLC

(57) ABSTRACT

In the context of an endless conveyor finishing machine, the method of the invention consists of preparing objects which are aligned on the battens of said conveyor with a view to delivering same to, for example, a capping station of a filling machine, wherein said preparation method consists of modifying the position of each batten so as to cause each row of objects to move from a horizontal position to a position that is sufficiently inclined, for example vertical, so as to cause the automatic unloading of said batten and the discharge of the series of objects toward a receiving and transit area in which said objects are inserted, single file, into the chute of a conveying device. The finishing machine for implementing the method comprises a module built into the conveying device, including means for propelling the objects to a sufficient height in order to feed same to, for example, a capping station, and for carrying out a complementary selection, checking, and sorting operation on said objects.

20 Claims, 19 Drawing Sheets

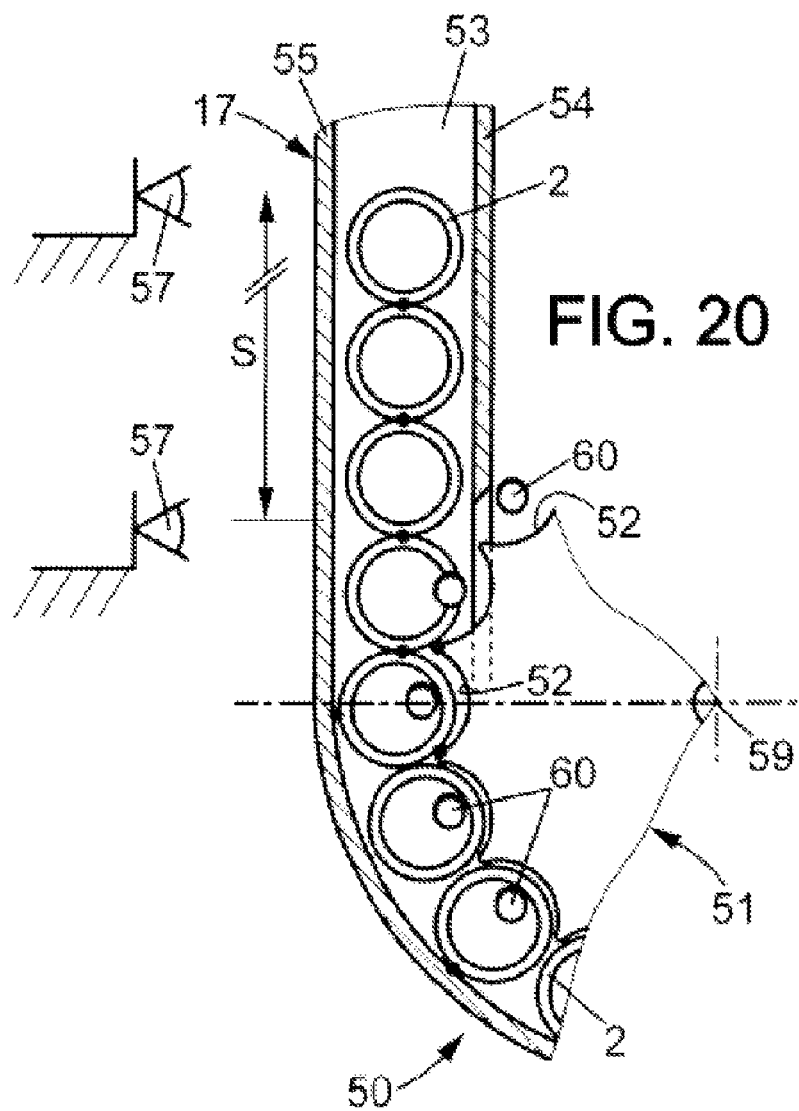

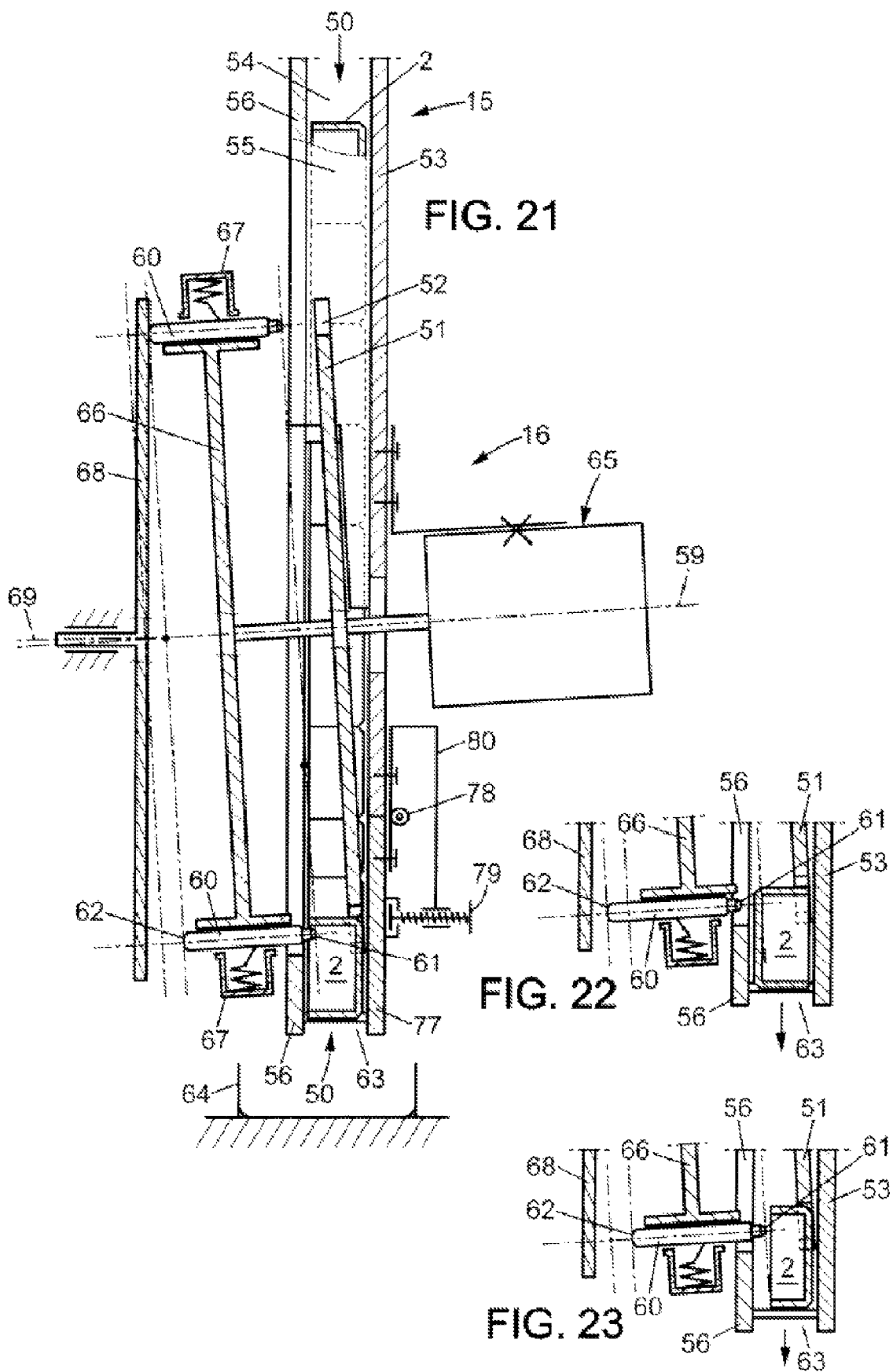

Figure 1:
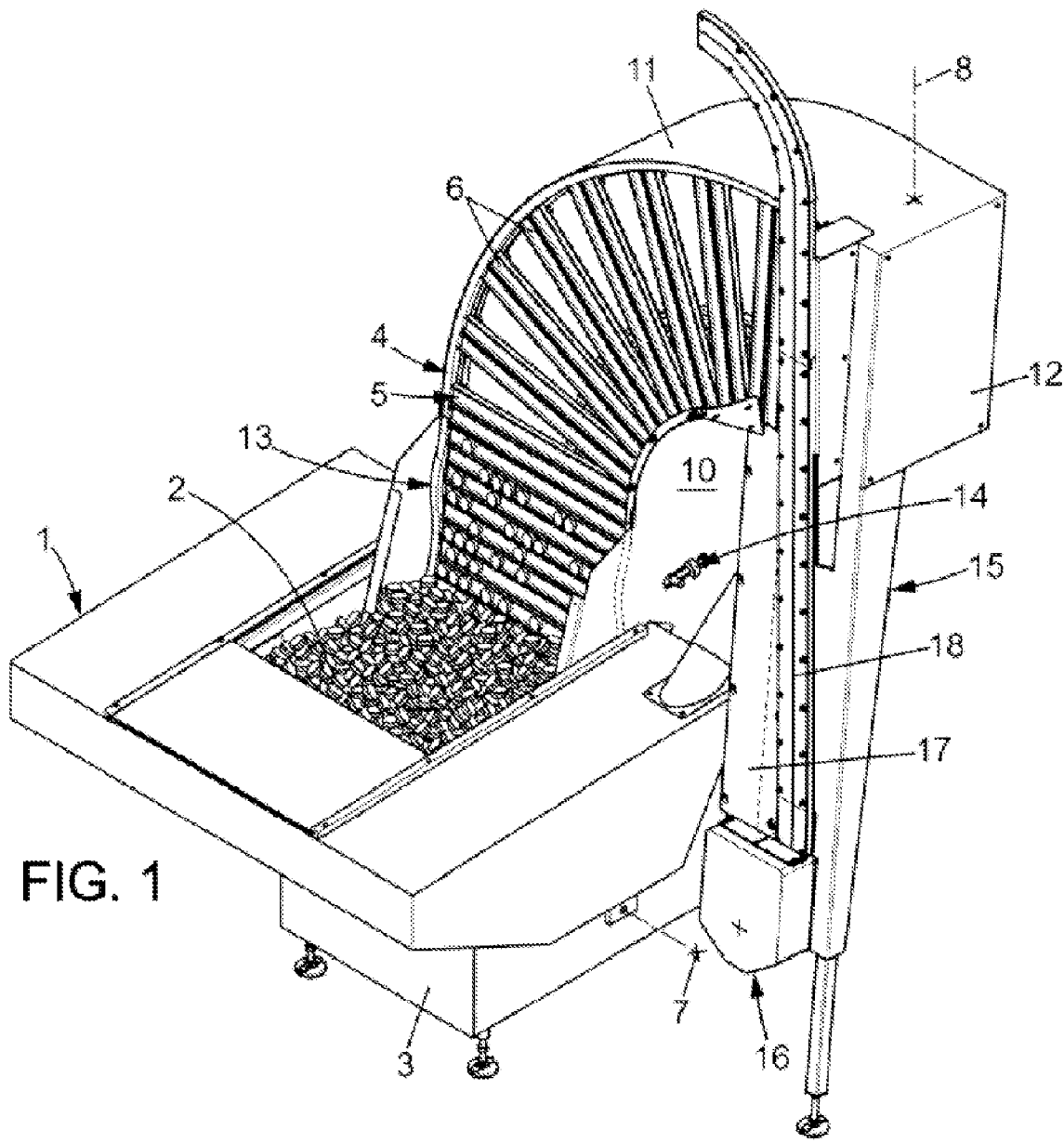

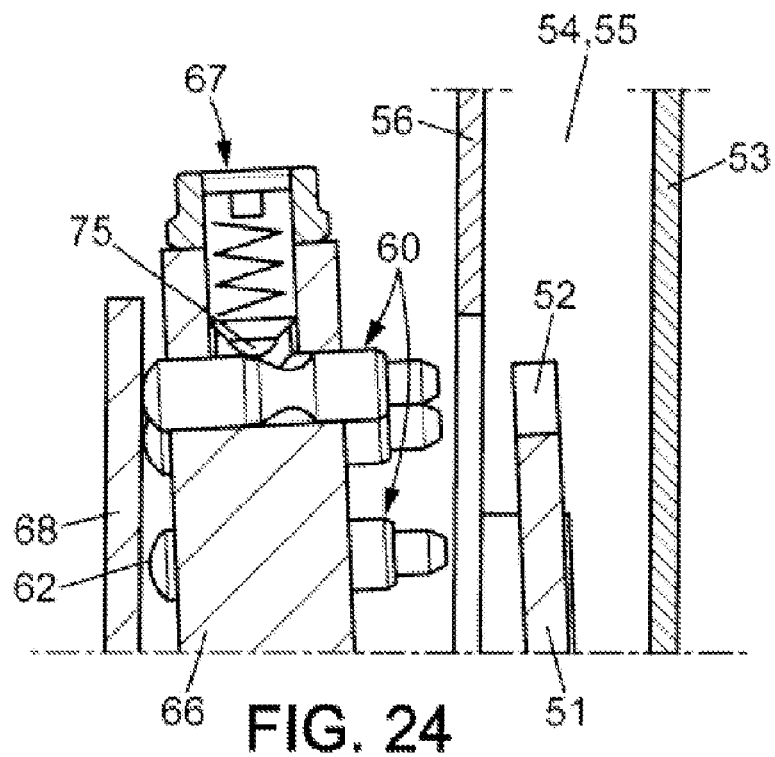
FIG. 24
FIG. 25
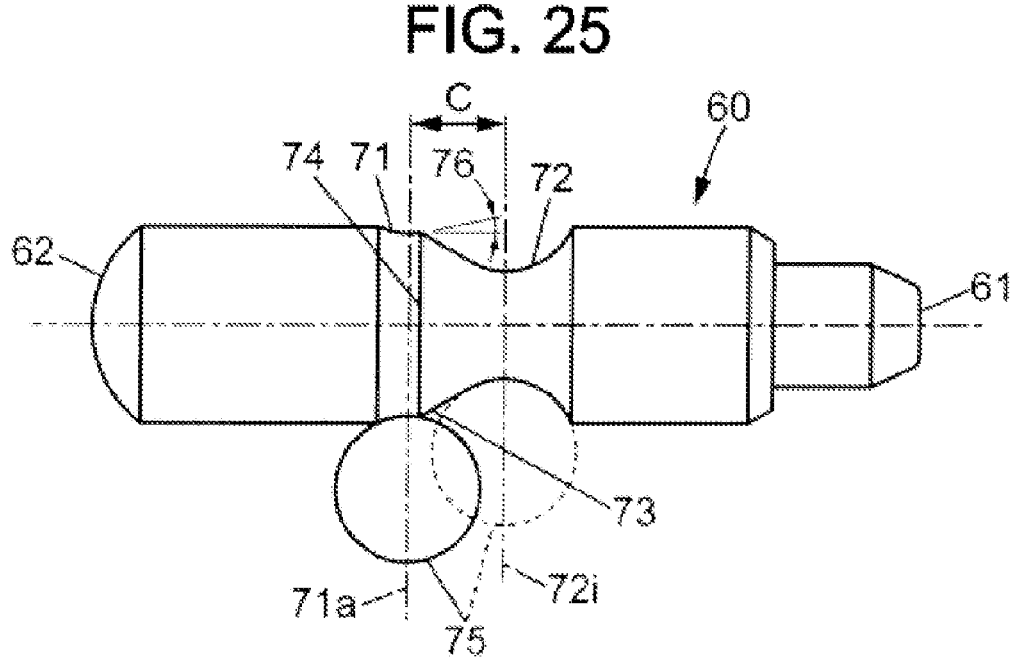

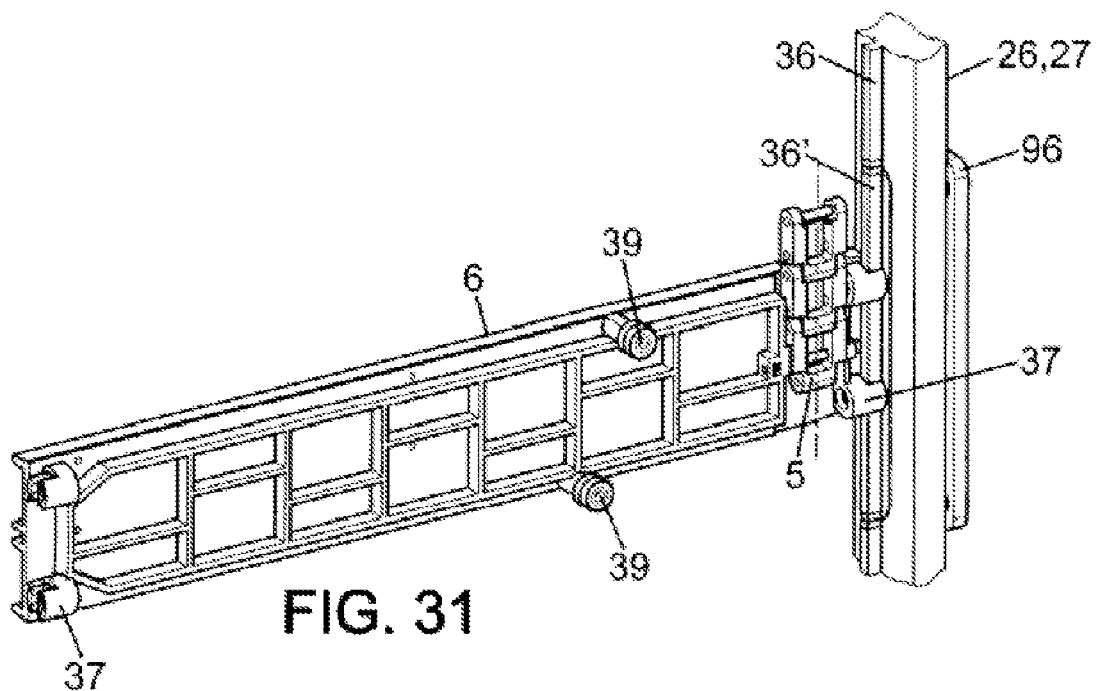
FIG. 31
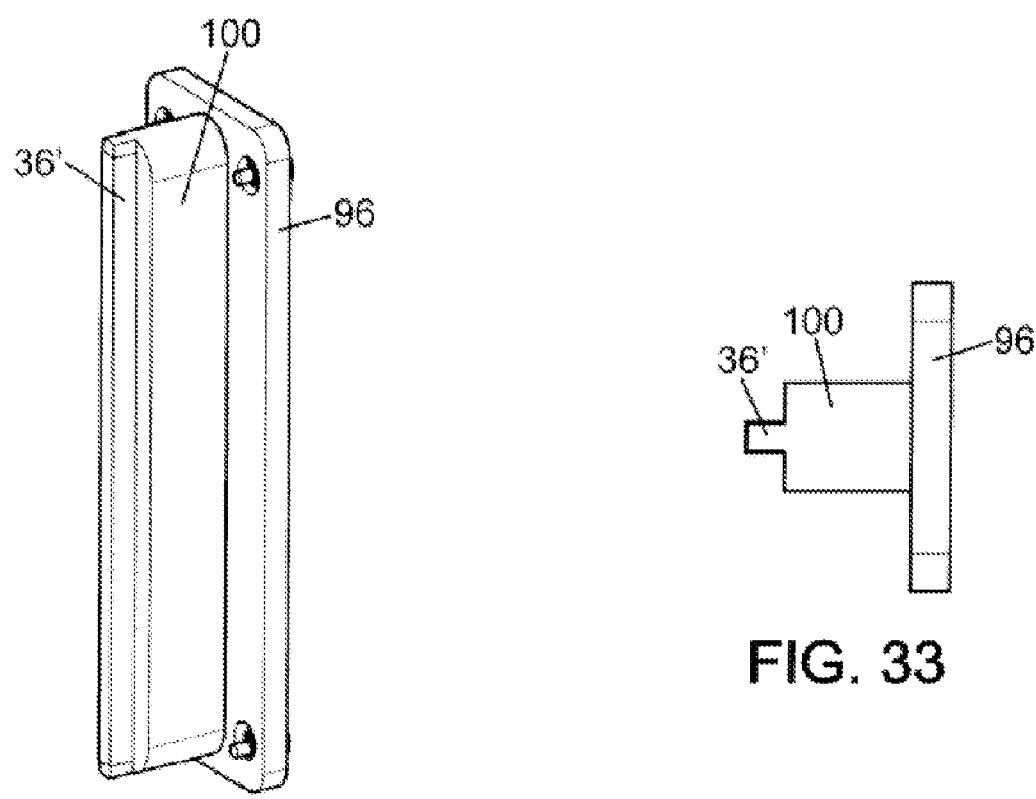
FIG. 32
FIG. 33

METHOD AND MACHINE FOR PREPARING STOPPERS, CAPS, OR OTHER TYPES OF OBJECTS

CROSS REFERENCE TO RELATED APPLICATIONS

This application is a National Stage of International Application No. PCT/FR2011/051057, filed on May 11, 2011, which claims priority from French Patent Application No. 10 55201, filed on Jun. 29, 2010, the contents of all of which are incorporated herein by reference in their entirety.

The invention relates to the field of sealing element preparation machines, generally called cap feeders, which are machines capable of feeding bulk objects in a proper state, such as stoppers, caps, or other types of objects, for example to a capping station of a bottling machine (also referred to herein as a filling machine).

The invention more particularly relates to a method for preparing these objects by means of a sealing element preparation machine comprising an endless conveyor extending between two shafts; the active side of said conveyor passes into the hopper where said objects are stored, and said conveyor comprises battens which, as they pass through said hopper, capture objects and use appropriate means to select only the properly oriented ones before delivering the objects to the capping station.

More specifically, the invention relates to, on these sealing element preparation machines, an original method of unloading the battens in order to send the objects, in a proper state and in single file, towards a capping station on a bottling machine for example.

This type of cap feeder, as described in document FR 2 876 991, comprises:

a hopper that can accommodate a large amount of objects in bulk, such as stoppers, caps, or other objects, a straight endless conveyor belt equipped with battens, in which the active side collects said objects directly in said hopper, and, above said hopper, a selecting and sorting station where the objects that are incorrectly seated and/or incorrectly oriented on the battens are dropped and recycled.

The endless conveyor belt may consist of a succession of battens assembled side by side on endless chain conveyors. The battens comprise one or more slots depending on the size of the objects to be organized, and these slots capture said objects in horizontal rows as they pass from the bottom to the top of the hopper.

The active side of the conveyor belt rises, with the battens loaded with objects, from the loading station at the hopper to the selection and sorting station which comprises a sort of bump that is arranged horizontally. This bump causes a pitching motion in the battens, which has the effect of unbalancing the objects incorrectly seated or incorrectly oriented in their slot and causes them to fall into the hopper where they are recycled.

After the bump, a few objects remain aligned in each slot, generally about five to ten objects for an ordinary conveyor belt. These are carried to a certain height by said conveyor belt, where they are ejected from their slot into a receiving and transit area from which they are routed towards a conveying device which delivers them in single file to the chute feeding the capping station.

In said FR document, the ejection of each row of objects from their corresponding slot occurs by using jets of compressed air. These air jets are positioned on one side of the conveyor and propel said objects towards the receiving and transit area which is located opposite the end of the slots, on the other side of the conveyor belt.

The objects are projected horizontally into a mouth where they must be compressed into a line in order to enter the single file passageway of the conveying device. This mouth has a relatively large entrance that is at least two times the width of a batten slot, and its exit corresponds to the size of a single slot in order to guide the stoppers or caps correctly.

This mouth is a source of problems because of the tendency of the objects to bump against each other in front of its exit, which often causes problems such as jamming.

Also, the use of compressed air to eject the objects from the batten slots is a source of significant energy expenditures, as well as noise pollution because of the noise caused by the escaping air at the propulsion vents for said objects.

Compressed air is also used by the conveying device, for raising the objects and delivering them to the entrance to the chute feeding the capping station.

When the cap feeder is part of a system, meaning when it is combined with other machines from blower to bottling machine, etc., the compressed air used to eject the objects carries particles which are undesirable in this type of facility where multiple machines are grouped for sterility reasons; these particles constitute actual pollution.

Machines do exist which do not use compressed air to eject the objects arranged in the batten slots. In U.S. Pat. No. 4,735,343 for example, the slots are emptied by means of a wiper bar arranged at an angle relative to the direction in which the conveyor belt advances so that the objects are ejected from their slot as the conveyor belt advances.

In this machine, the objects are also ejected horizontally and fall into a transit area from where they are guided towards a conveying chute.

This wiper bar scrapes the battens of the conveyor belt and acts through contact with the last object in the row to be ejected.

A friction phenomenon is established between the trio consisting of the last object, the wiper bar, and the lower wall of the slot on the batten. The speed at which the conveyor belt advances is generally determined by the issues related to this friction phenomenon.

Too high of a conveyor belt speed can cause incidents due to objects becoming stuck between the wiper bar and the slot of the corresponding batten, corresponding for example to deformations and/or damage to said objects.

As a result, this friction also has the effect of limiting the speed at which the conveyor belt advances and limiting the rate of delivery of the objects.

This type of unloading means is also not usable for objects such as caps because of these jamming problems.

The invention proposes remedying the above disadvantages by means of a preparation machine which eliminates the use of compressed air for unloading the battens and which can operate at high speeds to deliver properly oriented objects.

The invention first proposes an original means of ejecting the objects, which in general avoids actions requiring direct contact with said objects during their ejection from the slots, thus avoiding incidents of the types mentioned above such as the sticking and/or deformation of objects in the slots or the jamming of objects at the exit from the mouth which directs them towards the chute feeding the capping station.

Firstly, the invention proposes a method for unloading the battens on an endless conveyor type of sealing element preparation machine, and in particular an original method for unloading the slots of these battens when they present some objects collected from the hopper of said preparation machine, said objects being arranged in a line on the different battens and, after grouping, forming a series of objects in each slot.

Unlike the dispersion observed in prior art machines, the series of objects retains its form as it exits a batten slot when the method of the invention is applied, meaning it is able to remain more or less linear all the way to the entrance to the single file passageway, which is in the form of a chute, of the conveying device which connects the preparation machine to the chute feeding the capping station.

To achieve this delivery of objects to the chute feeding the capping station, the invention proposes supplemental means which allow raising the objects to an appropriate height corresponding to that of the entrance to said feed chute, said supplemental means also enabling an additional operation of selecting and sorting objects before their final routing to said capping station.

In fact, the invention concerns a general method for preparing stoppers, caps, or other types of objects, and also concerns the sealing element preparation machine which enables the application of this method to supplying a capping station on a bottling machine, for example.

In the invention, the method relates to the preparation of stoppers, caps, or other types of objects, aligned in the slots of the battens of an endless conveyor of a sealing element preparation machine, in order to deliver them to a capping station of a bottling machine for example, said method consisting of modifying, by means of said battens, the position of each line of objects, causing them to change from a position which is horizontal to a position which is sufficiently inclined to unload them from said slots due to gravity, sending said objects towards a receiving and transit area where they enter, single file, into the chute of a conveying device able to deliver them to said capping station.

In an optional arrangement of the invention, the operation of unloading the slots of the battens can be done by applying a combination of means comprising, in addition to gravity, a propelling of the objects by compressed air, said combination making it possible to limit the angle of incline of the battens and of the series of objects and, as a result, to limit the length of the active side of the endless conveyor equipped with battens and to limit the length of the endless conveyor in general.

Still according to the invention, in this method for preparing objects, the operation of unloading the slots of the battens of an endless conveyor consists of placing the battens at a substantially vertical incline in order to achieve a complete and automatic unloading of said battens due to simple gravity.

In another arrangement of the invention, the method comprises an operation for preparing objects aligned in each slot of the battens prior to unloading, said operation consisting of moving the row of objects upwards, in its slot, so as to be able to establish a sort of head start to the ejection, said head start allowing the series of objects to begin assuming velocity, due to gravity, before exiting its slot.

Still according to the invention, in this method for preparing objects, the unloading operation additionally consists of inducing, particularly in the upstream portion, or head, of the series of objects as it falls, a movement in the direction the endless conveyor is advancing, at the unloading area, said movement taking into account the speed at which said endless conveyor is advancing as well as the gravitational acceleration in order to place each object of said upstream portion, at least, behind the one which precedes it, relative to said direction of advancement, ensuring said series of objects achieves a kind of equilibrium and especially of vertical continuity as it falls towards the entrance to the chute of the conveying device.

In another arrangement of the invention, the method for preparing objects also consists of:
gathering into a single line the objects coming from the batten unloading station, in a first portion of the chute that delivers objects to the conveying device, in order to force feed said conveying device,
in the lower portion of this supply and force-feeding chute, passing control of said objects to a propulsion system that has a star wheel arranged in a module comprising a U-shaped semi-circular guide channel,
raising said objects in a second chute portion, referred to as the rising chute, to above the level of the unloading area, in order to bring them to the entrance to the chute feeding a capping station, for example.

Still according to invention, the method for preparing objects also consists of carrying out a complementary operation of selecting, checking, and sorting said objects at the propulsion module, in order to eliminate objects which are non-compliant and/or those which are still incorrectly oriented, after the conveyor with battens passes over the bump of the preparation machine, said complementary operation consisting of using, during the passage of said objects in the semi-circular guide channel of said propulsion module, means associated with the star wheel in order to: —maintain the correctly oriented and compliant objects in their respective star wheel notches, during the time they pass in front of an ejection window arranged in the lower portion of said guide channel; or —abandon the incorrectly oriented or non-compliant objects in front of said ejection window where they are discharged automatically.

The invention also relates to the preparation machine which makes use of the method for preparing and readying objects and in particular the method for unloading the slots arranged on the battens of the endless conveyor,
said preparation machine comprising:
a station for loading said slots, comprising a hopper which is supported by a chassis and for containing said objects to be prepared,
a station for selecting and sorting said objects, said station being installed above said hopper in order to eliminate the objects incorrectly positioned and/or incorrectly oriented in said slots,
a station for preparing the objects in their slot in order to organize them into a compact series or line, and,
a station for unloading said slots, said unloading station comprising a receiving and transit area where the objects are guided, single file, towards the chute for said objects,
and a conveyance system consisting of:
said conveyor equipped with battens, which comprises an endless chain extending between two shafts, said battens being attached to said chain, said chain being able to curve or snake in the plane passing through the axes of its links, particularly when these links are in the same plane,
means for driving said endless chain so that the active side of said conveyor equipped with battens successively travels into said hopper, then to the selection and sorting station, and lastly to the unloading station,
an arching path supported by said chassis and which can be broken down into several portions on the side of the active object collection part, including in particular: —a first straight rising portion which extends from said loading station to a level located above said selection and sorting station, —a curving planar portion in which said battens swing and fan out in order to bring together and add load to each line of objects to prepare them for gravitational ejection at said unloading station, said path consisting of rails that are extended, at said shafts located at the ends of said endless chain, by flanges ensuring the continuity of said rails, said rails and flanges cooperating with each batten in order to guide and orient it along the entire length of said path.

In an optional arrangement of the invention, the preparation machine comprises two combined: unloading means unloading means that make use of gravity and the weight of the objects, and additional unloading means of the type that use air jets aimed at the slots to push and accelerate the ejection of each series of objects towards the receiving and transit area.

Still according to the invention, in the case of a purely gravitational unloading operation, the endless conveyor comprises, at the unloading station, a second straight portion at the end of the arching portion, said second portion extending horizontally in a substantially vertical plane at the unloading station, in order to vertically orient the slots of said battens, opposite the object receiving and transit area where the unloading occurs.

In another arrangement of the invention, the endless chain of the conveyor equipped with battens is arranged to curve in the plane of the axes of its links, said endless chain being attached to one of the ends of said battens and, in particular, to the end located on the side of the smaller radius of curvature of the arching path, meaning on the side of the object receiving and transit area.

Still according to the invention, the means for guiding and orienting the battens on the arching path comprise:

rails arranged at the sides of the chassis in order to establish the surface on which said battens travel and to control their pitch motion, said battens comprising guide elements arranged at their ends that cooperate with said side rails, and, a rail acting as a cam in order to adjust the angular orientation of the battens relative to each other, said battens comprising at least one pair of cam followers which are guided by said rail-cam in order to adapt the orientation of said battens according to their position on said path and cause them to assume, in particular: —a horizontal position for the loading station and for the selection and sorting station, and —a substantially vertical position for the unloading station, with, between the two, —an evolving fanned-out position for the station that prepares for the unloading of said battens.

In another arrangement of the invention, the batten-orienting cam rail is located between the two side rails, at a distance from the inner side rail, meaning the one which is on the side of the receiving and transit area, which substantially corresponds to a third of the distance separating said side rails.

Still according to the invention, the machine comprises means for preparing for the unloading operation, said means being arranged upstream from the receiving and transit area where the unloading occurs and consisting of a ramp-like arrangement, forming a shoulder which acts as a guide and ends in a sort of spillway, said ramp being placed between the battens and the front panel that retains the stoppers or caps arranged within the slots of said battens, said ramp having the function of adding load to the line of objects by raising it for a distance that is about twice the width of a slot, to prepare it for ejection and also to gain a head start to the ejection by increasing its potential energy, which can be converted into velocity when said line of objects is released, meaning when the object at the head of the line reaches the end of said ramp and until the moment it enters the receiving and transit area, and this initial velocity reduces the total time required to empty each slot and thus improves the object processing rate.

In another arrangement of the invention, the downstream portion of the ramp is arranged to act as a guide, and this guide extends from the end of said ramp to the entrance to the chute for the objects, said guide comprising a slide surface which defines a parabolic curve, said curve being established while taking into account the speed at which the battens are advancing and the gravitational acceleration, so as to maintain the series of objects in a column during its fall and, in particular, to do so in such a way that each object, regardless of its position in said column, is always slightly behind the object preceding it in a direction which corresponds to the direction of advancement of the endless conveyor equipped with battens, at the receiving and transit area.

Still according to the invention, the machine comprises a front panel which covers the battens receiving objects, said panel extending longitudinally beyond the guide, above the object receiving and transit area, for a distance which is about twice the width of the slot of said battens, and said front panel being extended longitudinally by a sort of flap which leaves a significant gap between it and said objects, said gap corresponding to the thickness of said front panel.

This arrangement allows a complete and total release of the objects from their slot at the end of the unloading station; in fact, the objects in question, caps for example, may remain within their slot due to the pressure that may be exerted on them by the front panel, because of the slight gap which exists between this panel and said objects and because of insufficient planarity both in said front panel and in the battens.

Advantageously, this flap may be mounted by hinges onto the chassis of the machine, in a manner that allows easier access to that end area of the unloading station.

Still according to the invention, the battens of the conveyor are in the form of rectangular plates, each plate being equipped, on its visible face, with one or more slots for capturing objects. In addition, each plate comprises on its hidden face, perpendicularly to the slot or slots for capturing said objects, a recess which is arranged to house said endless chain, said recess comprising, on the side of the smaller radius of curvature of the preparation station, a curved edge with a radius substantially corresponding to the mean radius of curvature of said endless chain at said preparation station, said endless chain comprising links of a length on the order of a third of the width of said batten and said chain being integrally attached to each batten by means of a pin extending between the edges of said recess and passing through the central link of the portion of chain located within said recess.

In another arrangement of the invention, the hidden face of each batten comprises cam followers which cooperate with the orienting rail, said rail comprising two grooves that respectively cooperate with one of the cam followers, said cam followers being offset relative to each other in the lengthwise direction of said batten and being located on each side, under the edges of said batten, so as to be positioned in an overlapping configuration, the cam followers of one of the battens being overlapping underneath the adjacent batten in a manner that provides as great of a cam follower interaxial distance as possible on a same batten, said interaxial distance allowing a highly accurate orientation and positioning of said battens relative to each other, all along the path traveled.

Still according to the invention, the endless chain of the conveyor equipped with battens engages with a gear wheel arranged at the upper end of the active side of said conveyor, said gear wheel being driven by a gear motor integrally attached to the chassis, at its upper part.

In another arrangement of the invention, the lateral ends of the battens, on the endless chain side, are beveled starting from the longitudinal axis of said endless chain, to allow said battens to fan out and swing or pivot at the preparation station, and to maintain these battens in abutment on the straight portions of the path of said battens, in order to avoid undesirable embedding of objects between two consecutive battens.

Still according to the invention, each corner of the battens comprises guide means for cooperating with the side rails integrally attached to the chassis and for following the path imposed by said side rails of which certain parts are straight and other parts are curved, either within a plane, or over a cylinder section at the connecting flanges of said rails, said guide means comprising pockets arranged in said corners of the battens, for positioning guide elements in the form of studs of appropriate thermoplastic material, said studs being cylindrical in shape and centered on an axis parallel to the longitudinal axis of the corresponding batten, in order to be able to pivot in their pocket, and said studs comprising a slot into which the active portion of the guiding side rail fits, said active portion being in the form of a continuous tongue.

In another arrangement of the invention, the machine comprises a window on at least one of its sides, arranged at the level of the guide rail for the battens, said window being sized to allow the passage of a batten and normally being hidden by a plate which comprises a section of substitute tongue, said substitute tongue extending between the two ends of the main tongue of said guide rails with, between said substitute tongue and said plate, a sort of plug which fits into said window and which allows precisely positioning and wedging in place said substitute tongue relative to said main tongue.

This arrangement allows removing at least one of the battens in case of an incident and, in particular, allows replacing these battens.

In another arrangement of the invention, the chute which receives the objects comprises an entrance placed at the unloading station, in the object receiving and transit area, said entrance being less than or equal to 1.5 times the width of the batten slot, and preferably less than or equal to 1.5 times the diameter of said objects, and this entrance is located at the lower end of the parabolic guide of said receiving and transit area, said receiving area comprising an overflow with a bypass channel for recycling objects that miss said entrance.

Still according to the invention, the preparation machine comprises a duct for recycling the objects that reach the receiving area without entering the chute for said objects, said duct extending from the overflow to the loading station, and in particular into the stirring chamber which is located at the lower portion of the conveyor, between the conveyor and a wall which delimits the hopper on the side of said conveyor, isolating the battens of said conveyor from the stockpile of objects contained in said hopper.

Still according to the invention, the device for conveying the objects exiting the unloading station consists of: —the chute for receiving and feeding the objects, which acts as an accumulator downstream from the unloading station, —a rising chute which extends to the entrance to the chute feeding a capping station, and, between these two chutes, —a propulsion module which comprises a U-shaped semicircular guide channel which establishes the connection between said chutes, said connection channel partially enveloping a star wheel which propels said objects into said rising chute.

In another arrangement of the invention, the propulsion module of the conveying device has, in the guide channel, two angular sectors formed as arc sections which continuously guide the objects and, between the two, an open angular sector forming an ejection window which allows conducting an additional selection and sorting operation on the objects, particularly on objects in the form of plastic caps which contain a hollow, said module becoming a propulsion and selection module and comprising complementary means for selecting objects, said means consisting of an object support system which is organized to retain the compliant and properly oriented objects in said guide channel or to release the non-compliant or improperly oriented objects at the ejection window, said supplemental selection means being located at said guide channel in which the star wheel is housed, and said means transforming said propulsion module into a multipurpose propulsion and selection module for said objects.

In another arrangement of the invention, the objet support system comprises a plurality of pins arranged opposite each notch of the propelling star wheel, each pin being movable between two stable positions: —a first stable position in which the pin is placed in the hollow of the object held within the corresponding notch, in order to maintain said object in its notch as it passes in front of the ejection window, and —a second stable position which results from a backwards movement of the pin caused by an obstacle and in particular by contact with an improperly oriented object which prevents said pin from entering the hollow of said object.

Still according to the invention, the propulsion and selection module of the conveying device comprises:
a motor that drives the notched propelling star wheel,
a flange arranged at a distance from said wheel, integrally attached to the drive shaft of the wheel,
pins corresponding to each notch, said pins being mounted on said flange in a manner such that all the retaining ends of said pins are positioned along a circle of reference which is coaxial to the drive shaft of said star wheel.

In another embodiment of the invention, the propulsion and selection module comprises, at the star wheel, —a back wall which forms a wall of the guide channel, said back wall guiding the upper face of properly oriented objects, and, opposite this back wall,
a front wall forming a slide to guide the hollow base of said properly oriented objects, said star wheel and the pin-supporting flange being mounted on a drive shaft which is angled relative to the normal to said back wall, in a direction such that the circle of reference of the retaining ends of the pins intersects the plane of said slide along a line located above the level of the shaft of said star wheel, which in fact means that said pins gradually enter the hollows of the objects as said objects approach the ejection window, in a manner that allows guiding them and retaining them when they pass by said window.

Still according to the invention, the propulsion and selection module comprises, at the star wheel, two parallel coaxial disks of magnetic material, at least one of the disks acting as a guide for the object retaining pins, said pins consisting of a rod of non-magnetic material and said pins being mounted to freely move translationally within at least one of the two disks, in an axial direction, and a permanent magnet attached to said rod, allowing the pin to float between the two coaxial disks, between a stable active position which retains said objects and a stable but inactive position which leaves them free during their passage in front of the ejection window.

In another arrangement of the invention, the magnetic retaining pin comprises a spacer of non-magnetic material, said spacer being arranged axially between the permanent magnet and each of the two coaxial disks which are of magnetic material, and it adjusts the attractive force between said permanent magnet and each of the disks, favoring, in attractive force value, the one which corresponds to maintaining said pin in the inactive retaining position.

Still according to the invention, the propulsion and selection module comprises a reset cam for the retaining pins which have moved into the inactive object retaining position, said reset cam being able to return said retaining pins, when they are located outside the angular sector of the ejection window, from their inactive position to their active position of retaining the objects.

In a preferred arrangement of the invention, the retaining pins each have an end which ensures their reset, said reset end being arranged on the end opposite the retaining end, said reset ends of said pins being positioned along a second circle of reference which intersects the plane of the reset cam along a line located above the shaft of the star wheel, said reset cam being parallel to the back wall and being fixed or pivotable, driven directly by the pin or pins to be reset.

Still according to the invention, the back wall comprises a panel which can be moved to allow emptying the propulsion and selection module, at the ejection window, and in particular to allow removing the objects retained by the retaining pins and, possibly, those which are in the rising chute and/or feed chute.

In another arrangement of the invention, the preparation machine comprises, at the conveying device and in particular at the rising chute extending to a chute feeding a capping station, an endless belt extending between two pulleys spaced vertically apart, said belt acting as a moving wall for said rising chute and traveling at a speed that is on the same order as the speed at which the objects advance in said rising chute, this travel speed preferably being about 5 percent greater than said speed at which said objects advance in said rising chute.

Figure 2:
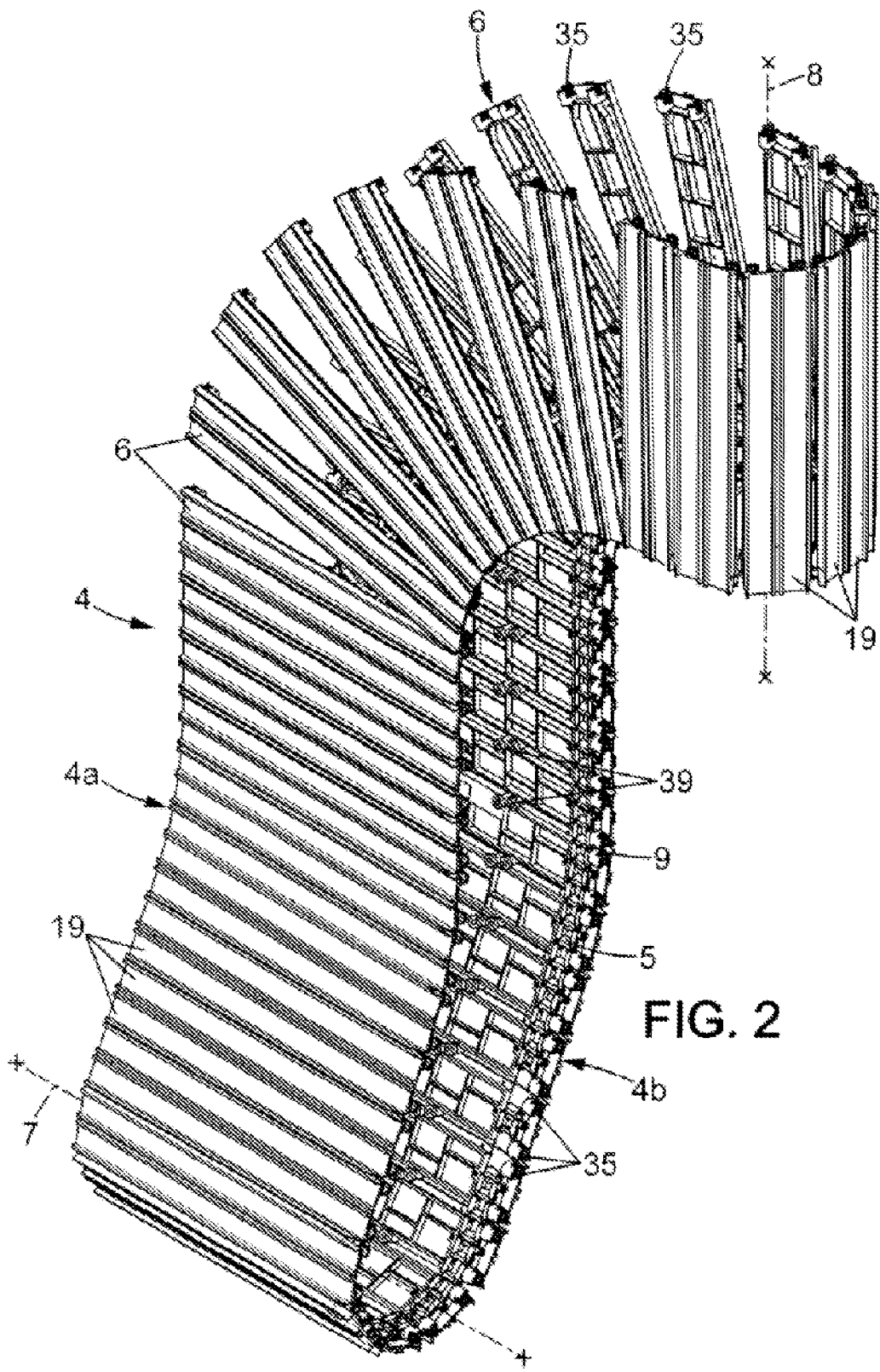
Figure 3:
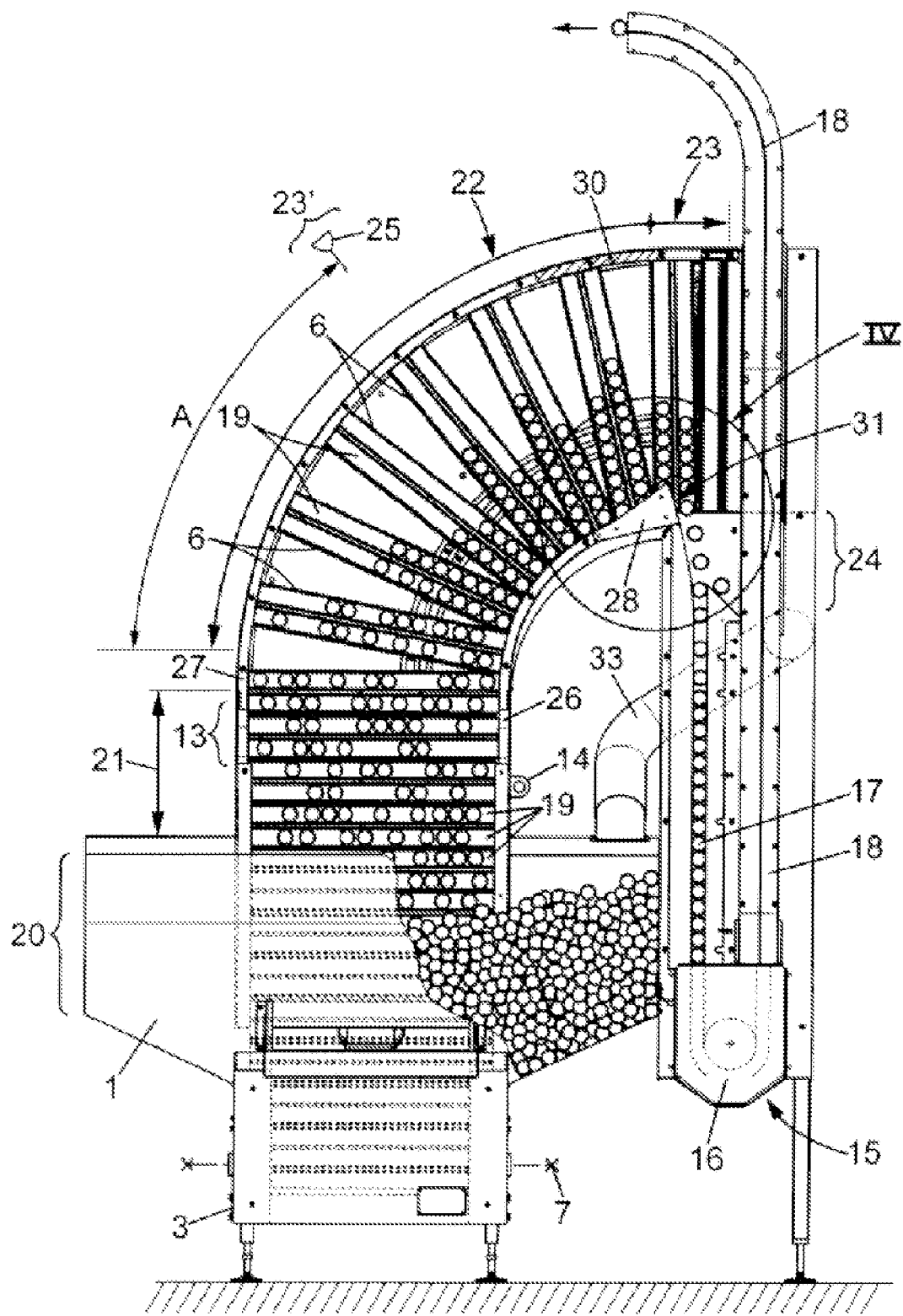
Figure 4:
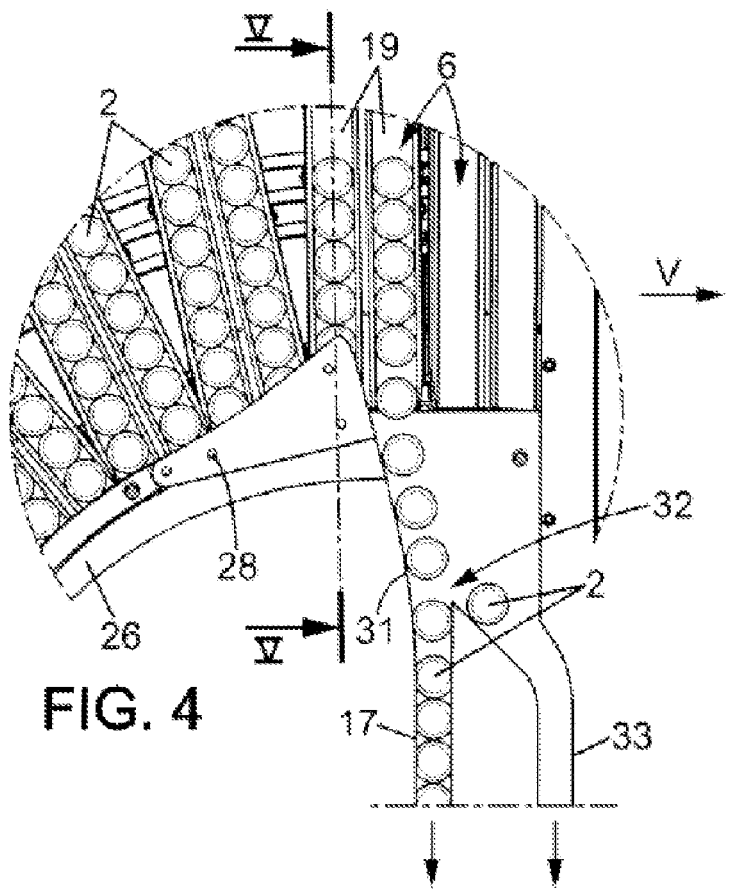
Figure 5:
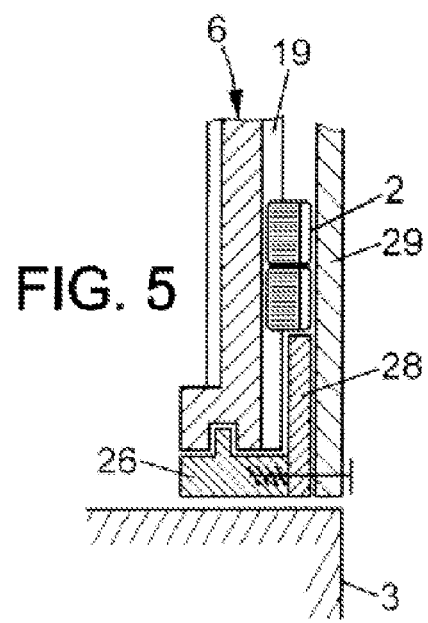
Figure 6:
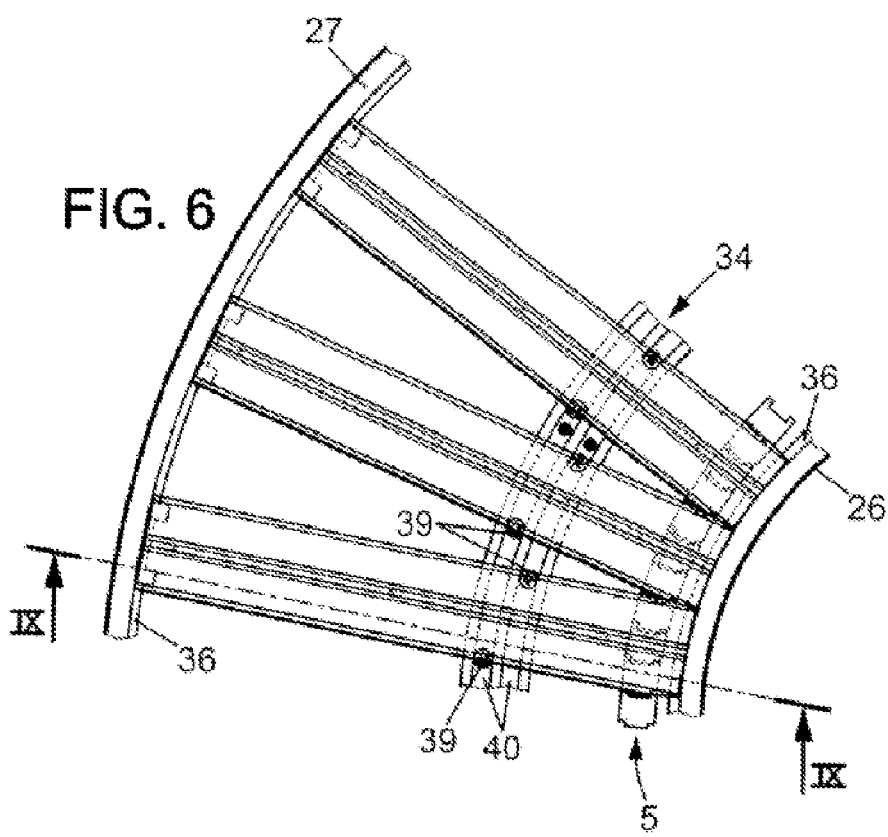
Figure 7:
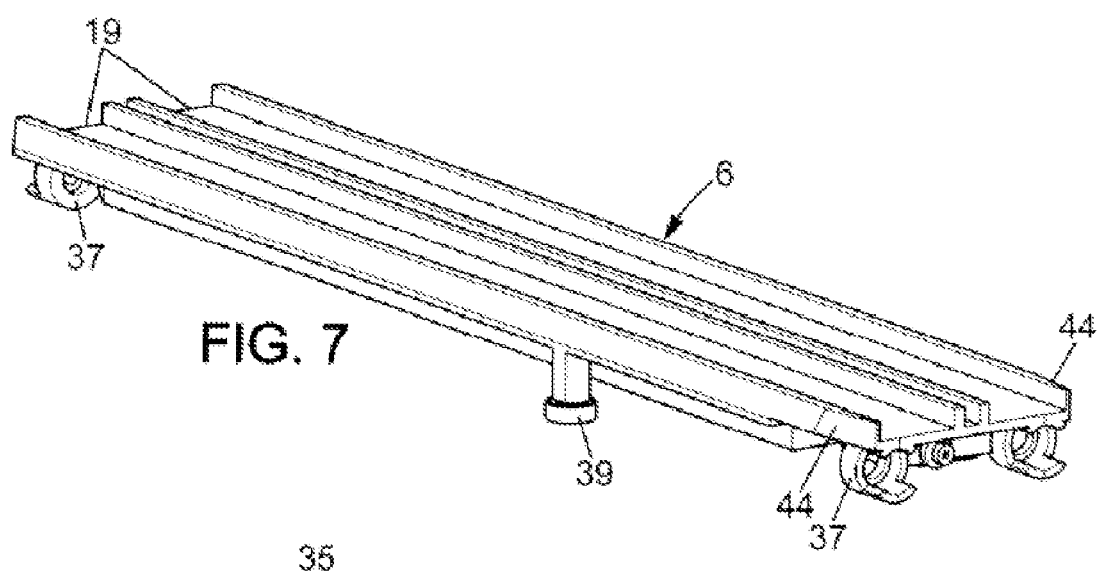
Figure 8:
Figure 9:
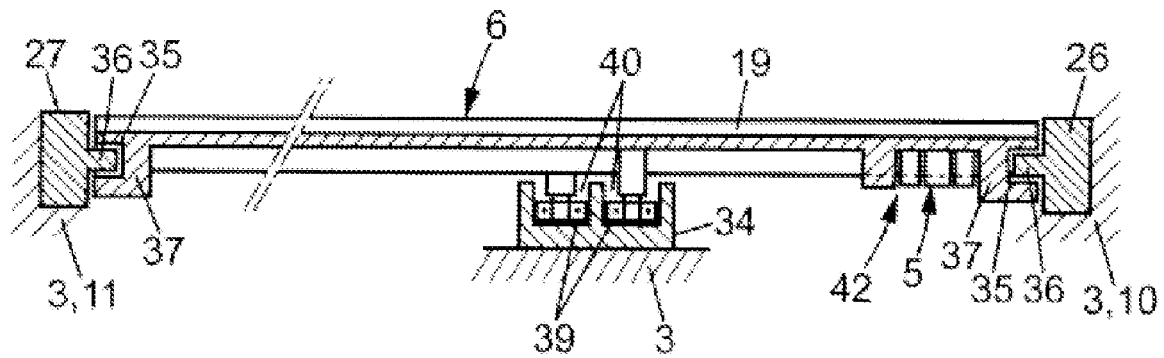
Figure 10:
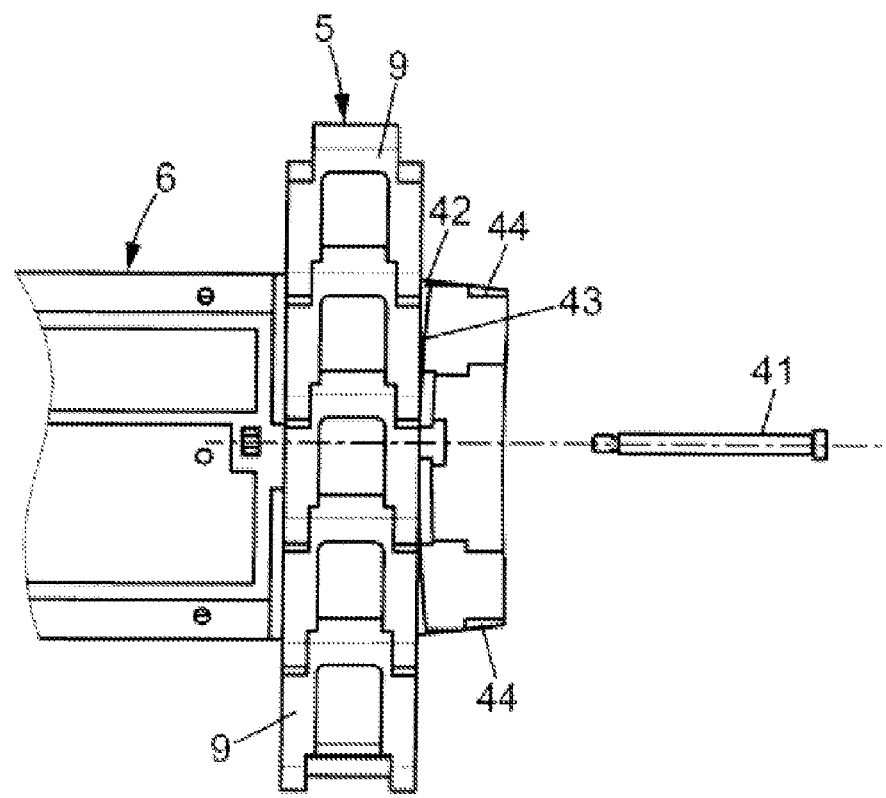
Figure 11:
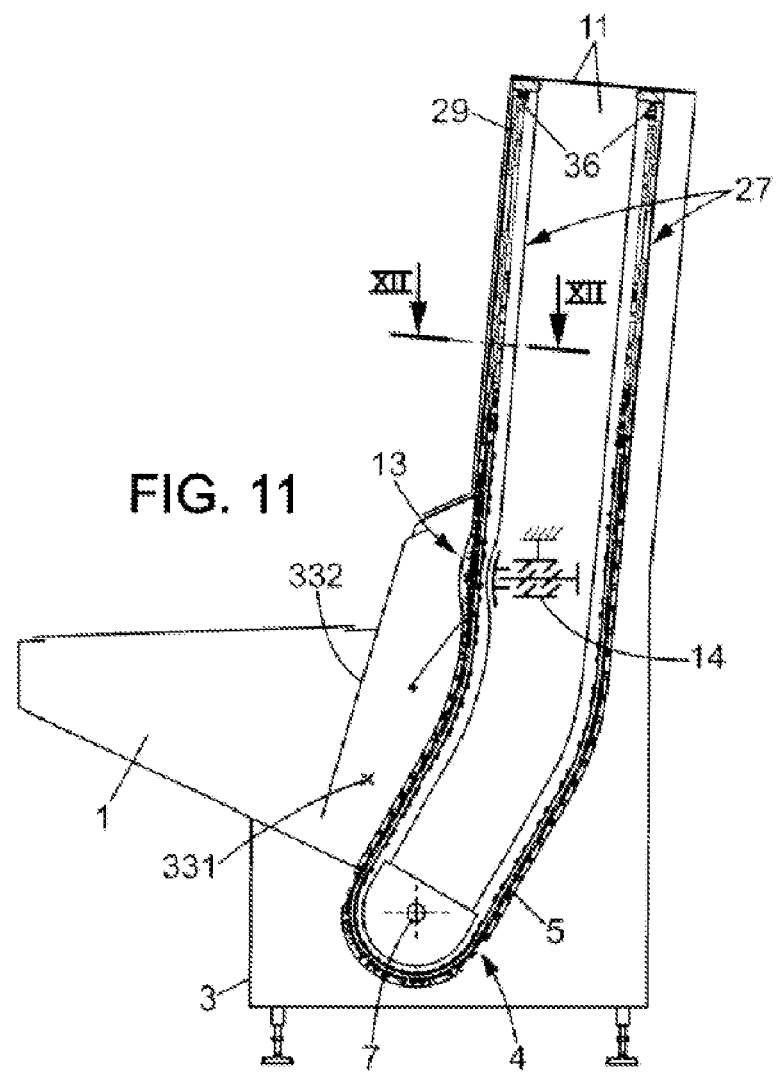
Figure 12:
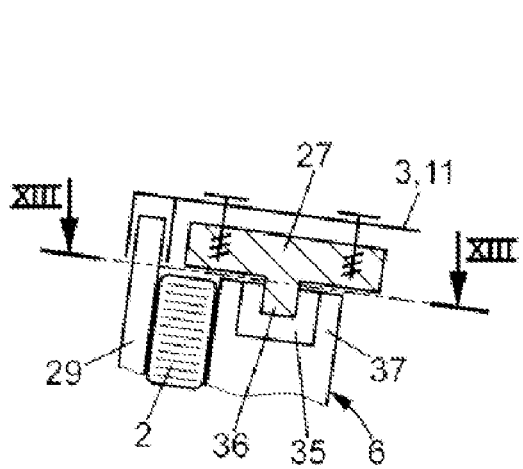
Figure 13:
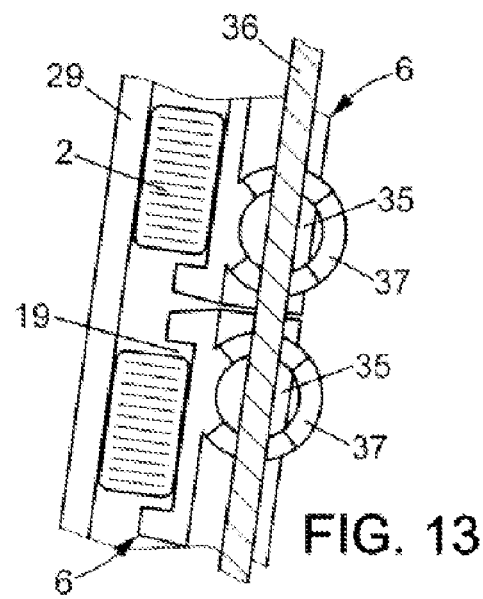
Figure 14:
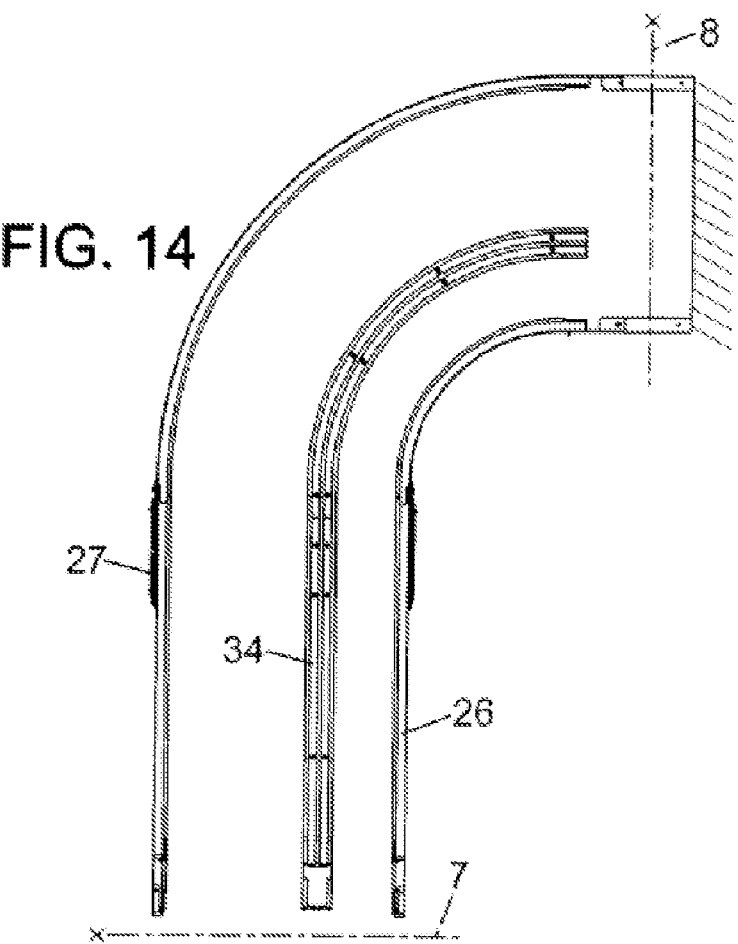
Figure 15:
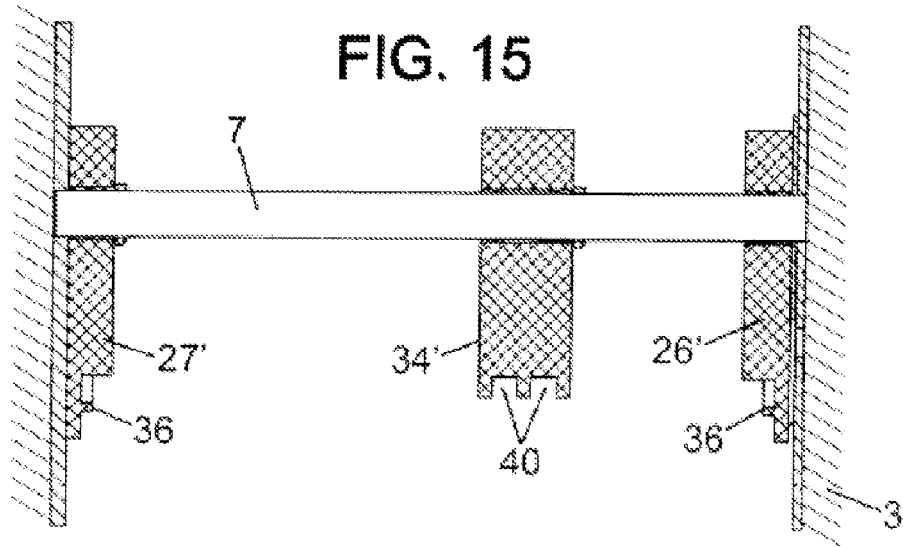
Figure 16:
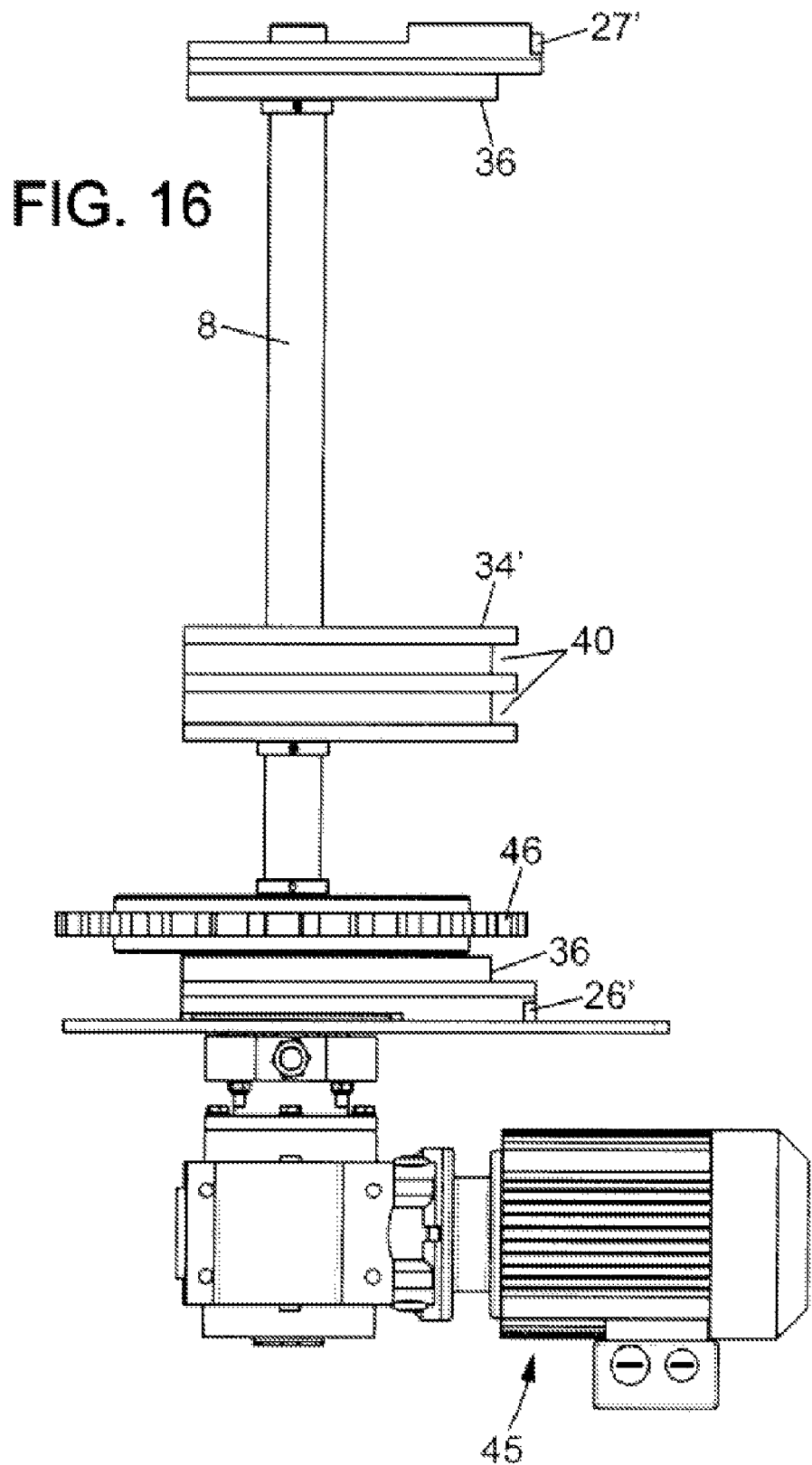
Figure 17:
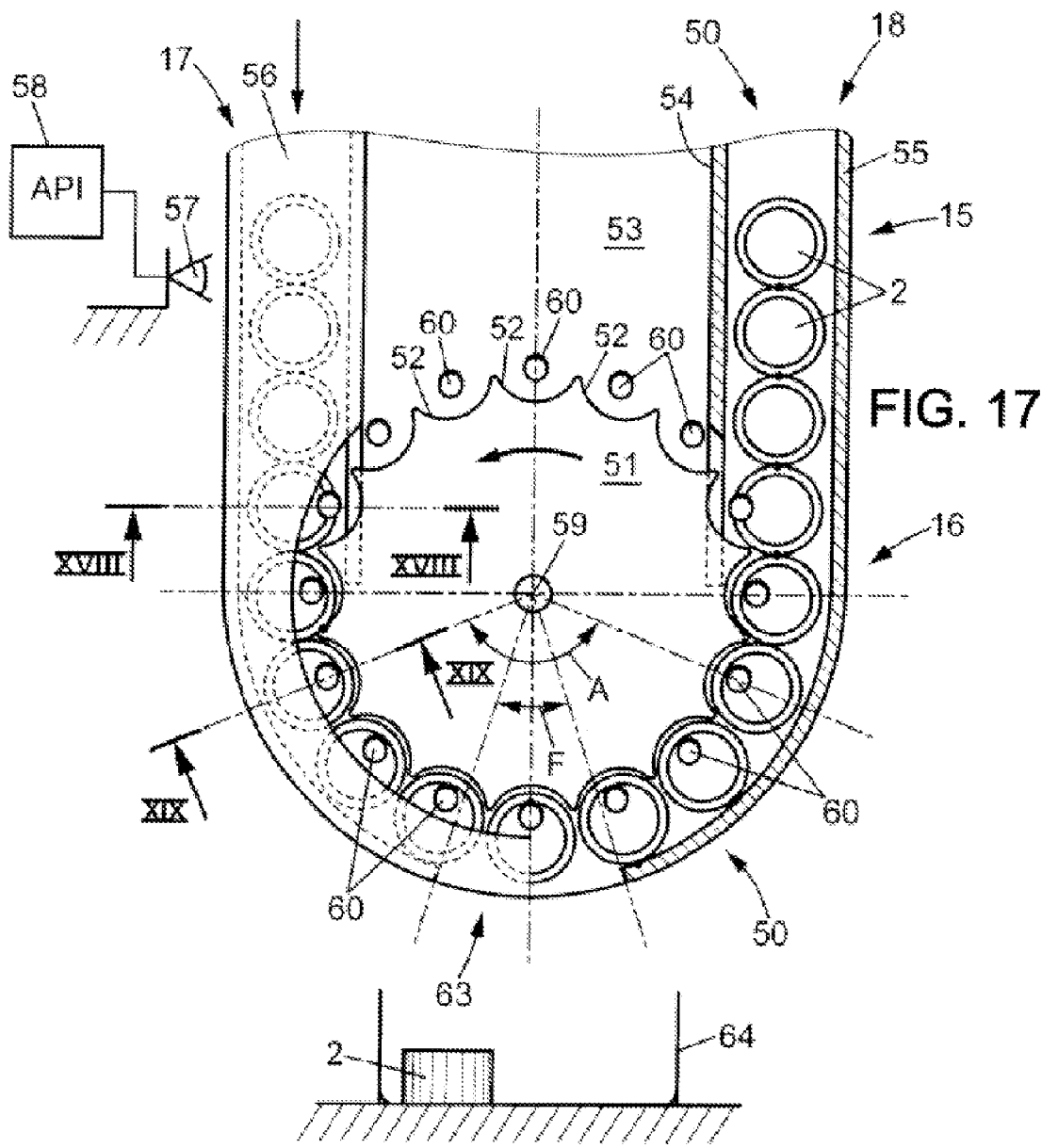
Figure 18:
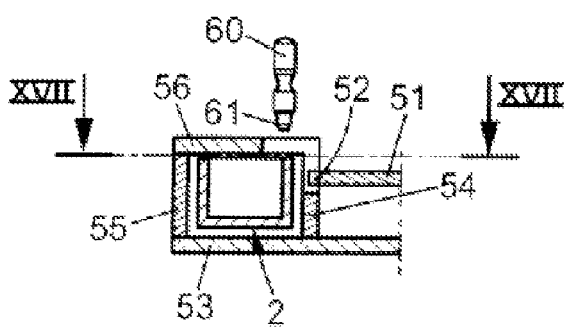
Figure 19:
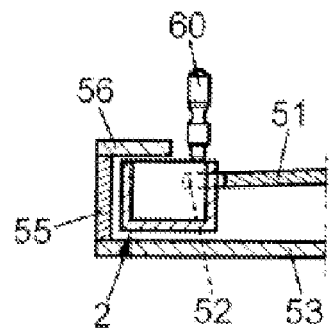
Figure 26:
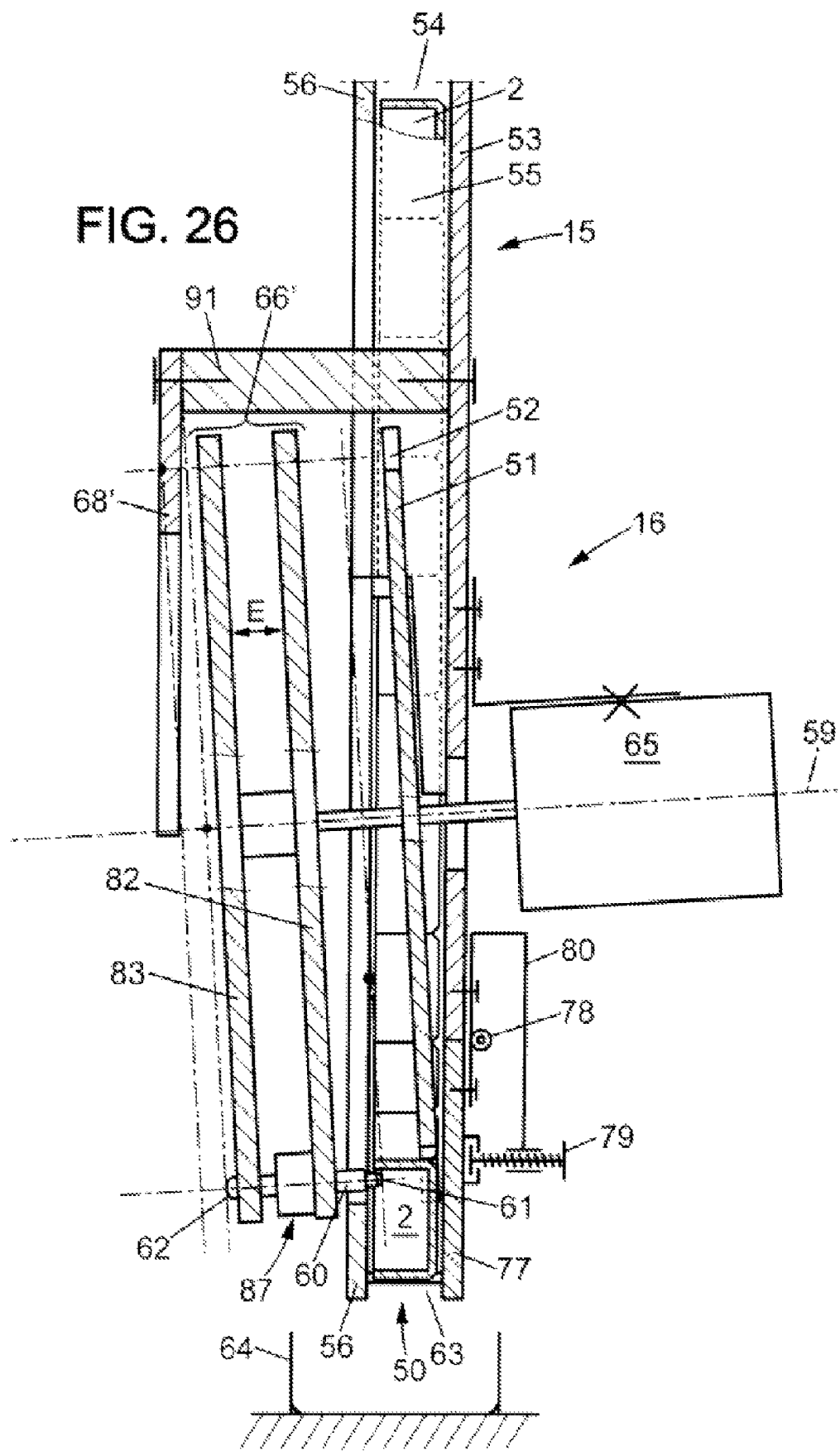
Figure 27:
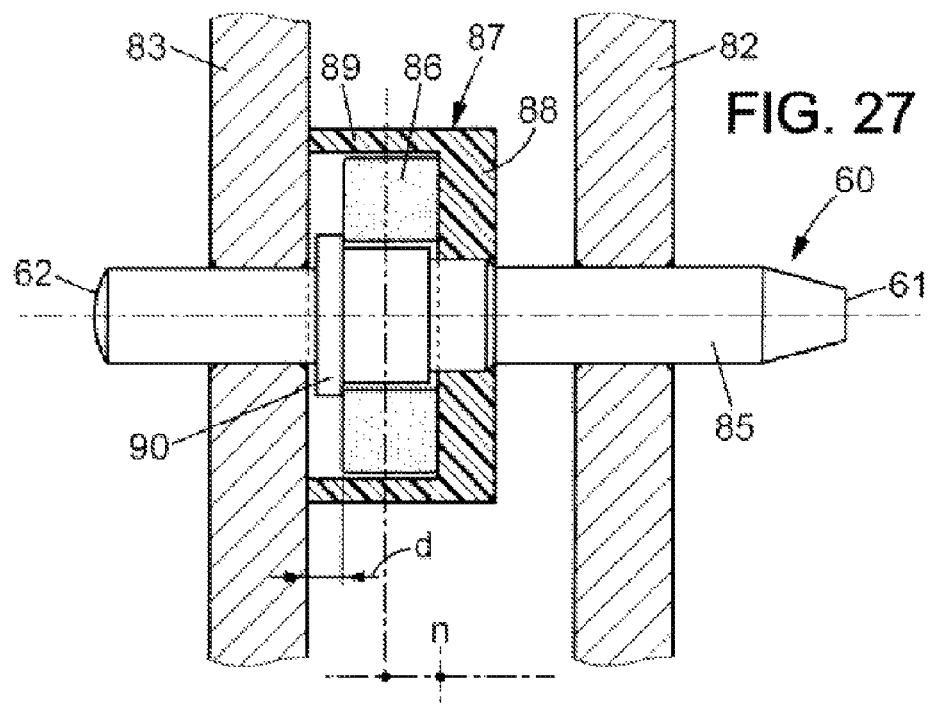
Figure 28:
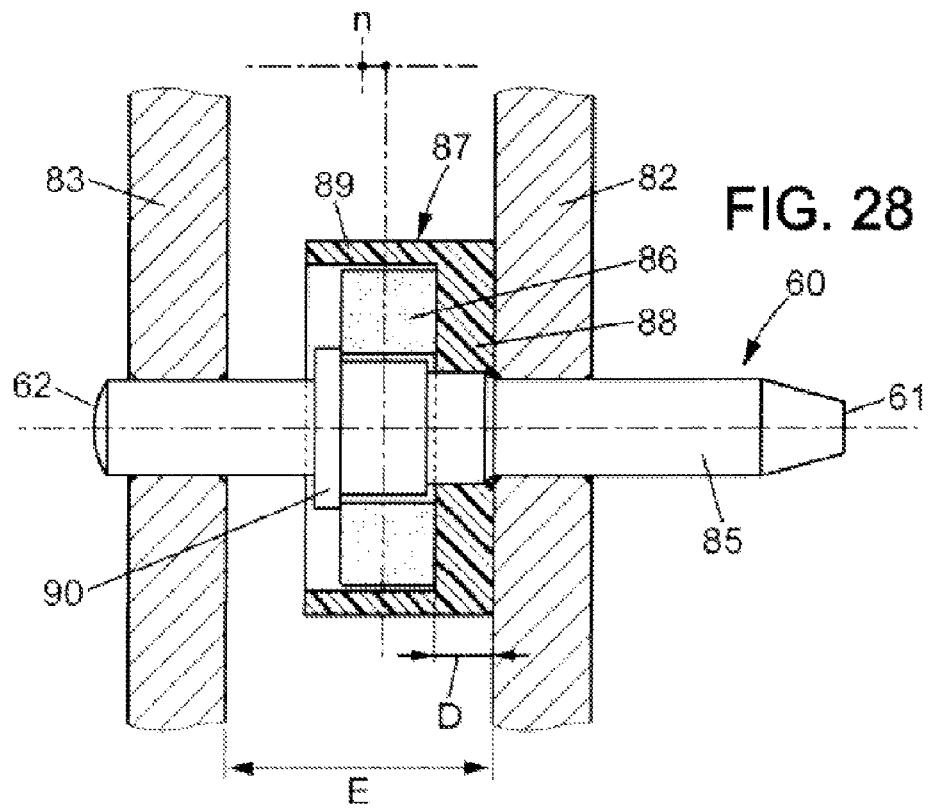
Figure 29:
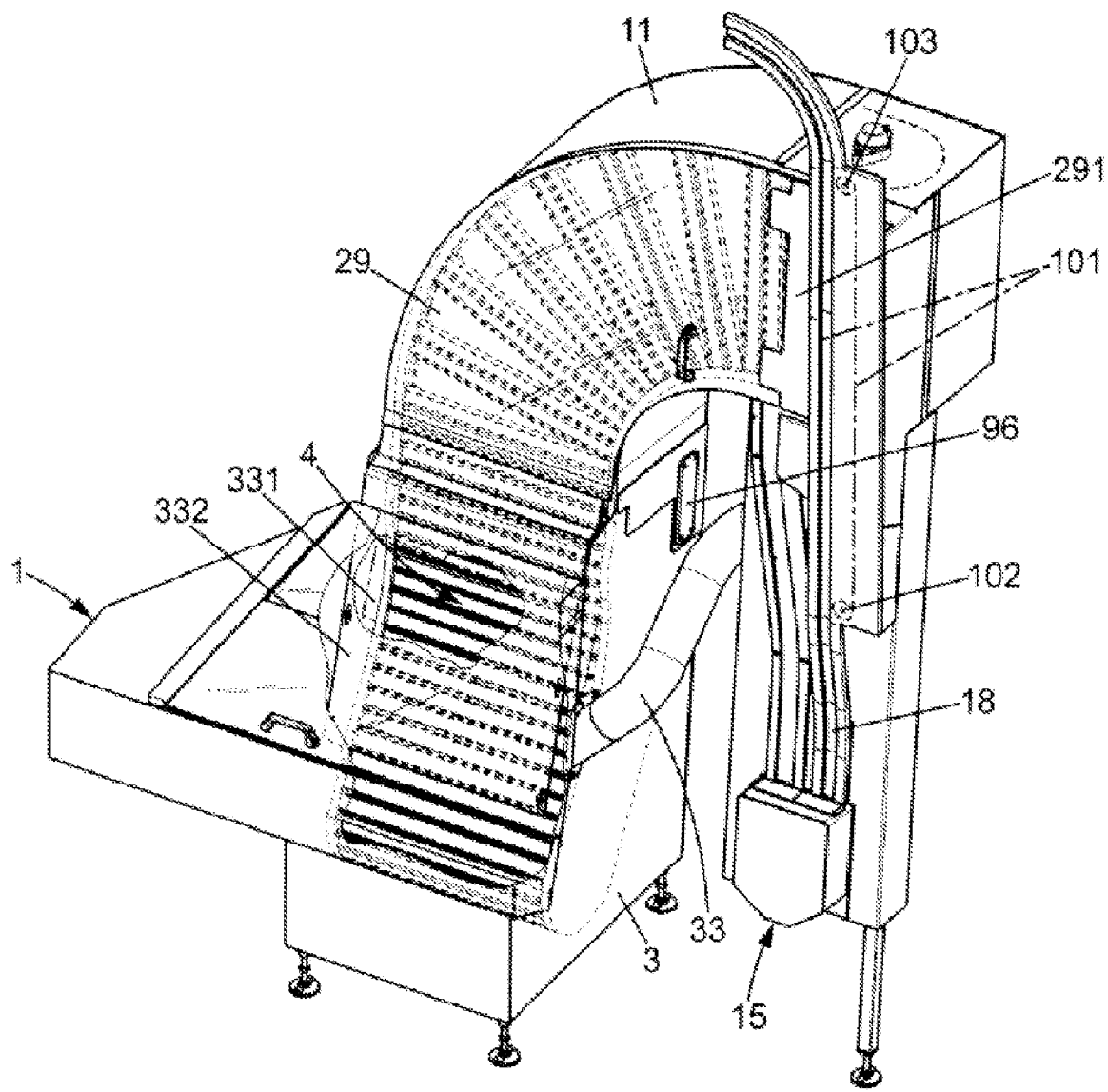
Figure 30:
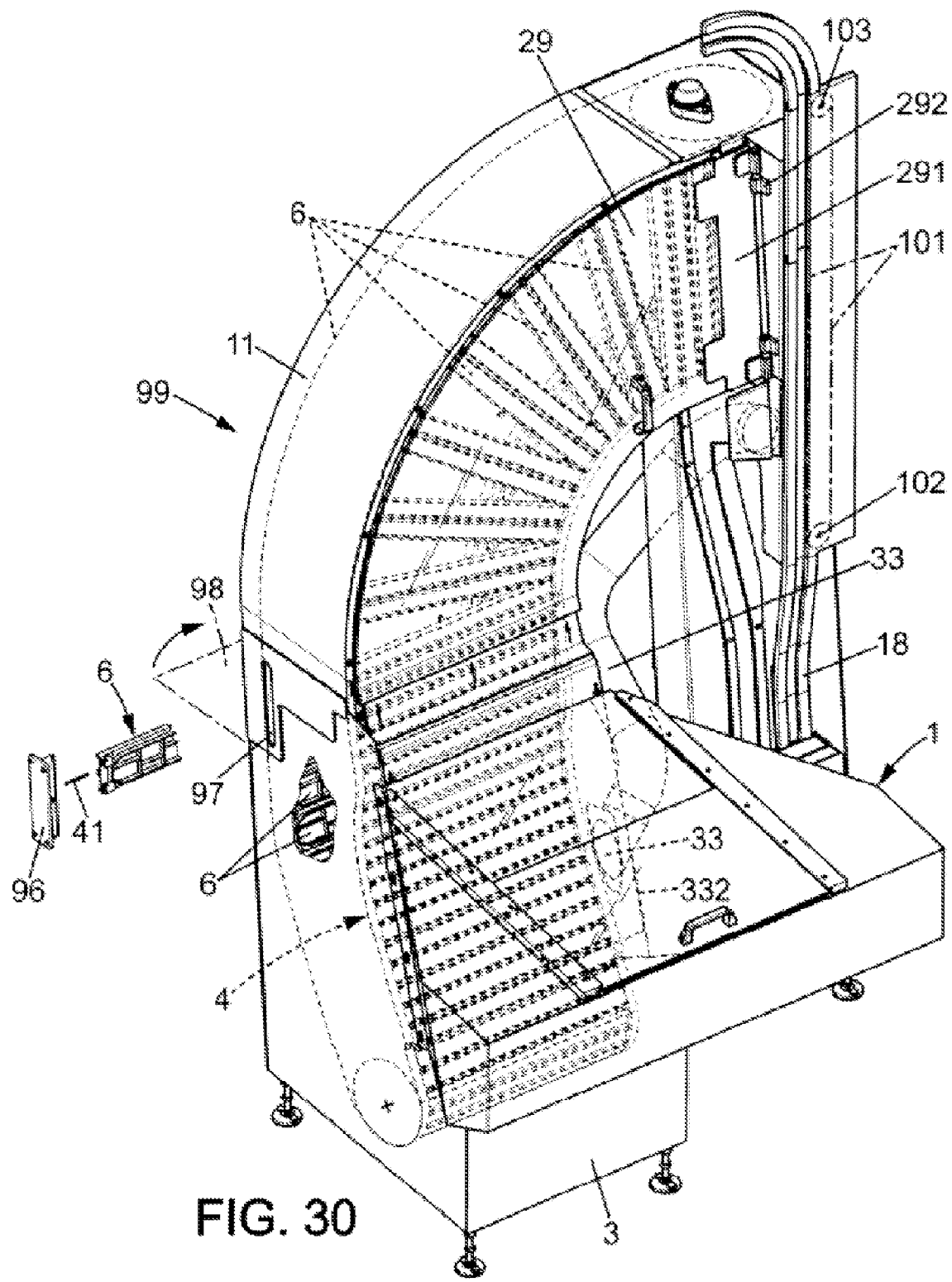
Figure 34:
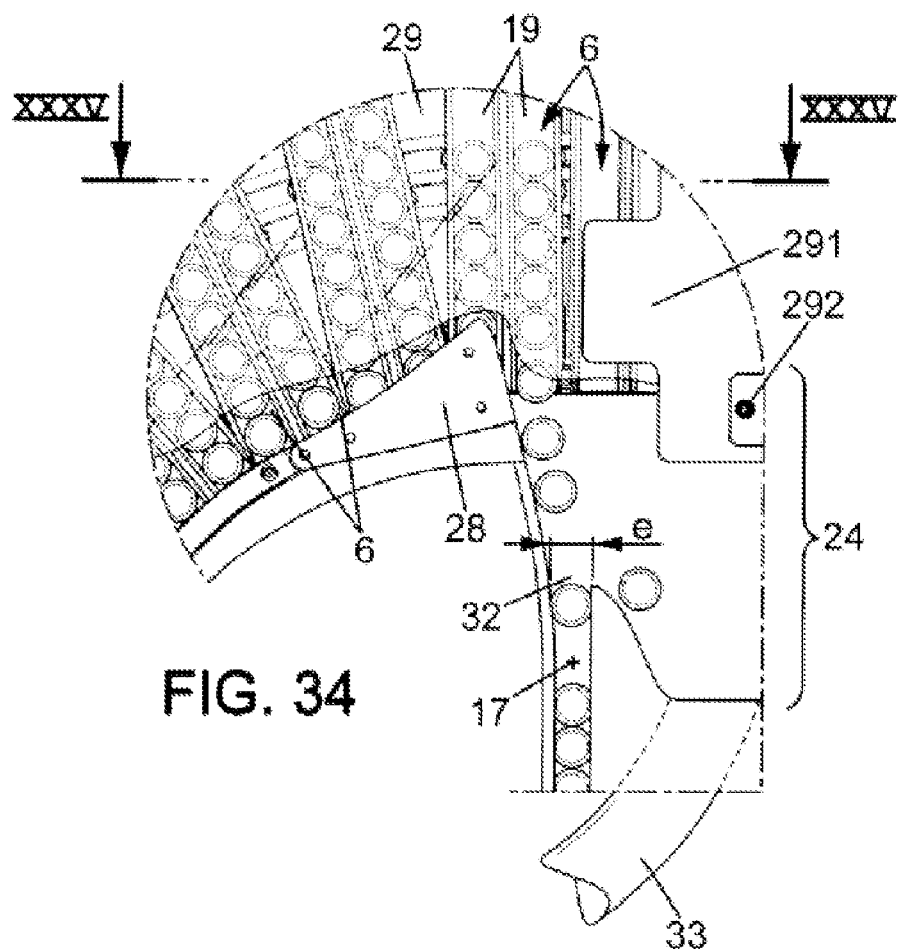
Figure 35:
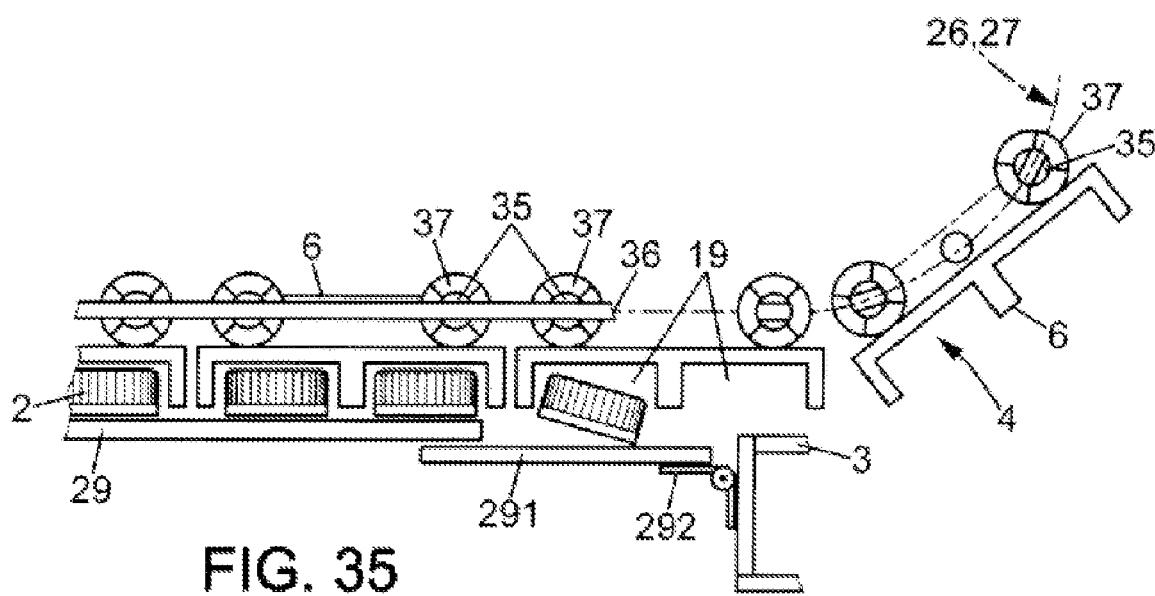

The invention is explained in a sufficiently clear and complete manner in the following description to enable its implementation, accompanied by drawings in which:

FIG. 1 is a perspective view of the preparation machine of the invention, with an associated conveying device and its object propulsion and selection module, FIG. 2 is an isolated representation of the endless conveyor with battens of the preparation machine, extending between two shafts, FIG. 3 is a front view of the preparation machine and its conveying device with the propulsion and selection module, in which certain parts are cut away to show various component elements, FIG. 4 represents the unloading station where the battens are emptied, which is the unloading area where the objects leave their slot and the area where they are received for transfer, via simple gravity, to the entrance of the chute which takes the objects and delivers them to the conveying device, FIG. 5 is a cross-section along V-V in FIG. 4, showing the shoulder on the preparation machine, said shoulder being arranged between the battens and the object retaining front wall, upstream from the unloading station, FIG. 6 represents a portion of the conveyor with its battens, where said battens are fanned out, FIG. 7 represents a batten in a perspective view, specifically showing the slots for capturing the objects as well as some of the guide elements which guide said batten, FIG. 8 is an isolated representation of a guide element for the battens that is in the form of a stud, FIG. 9 is a cross-sectional view along IX-IX in FIG. 6, showing a batten cooperating with its various guide means, FIG. 10 represents a section of a batten along with several links of the endless chain which assembles the battens together and which also serves to advance them, FIG. 11 is an transverse cross-sectional elevated view of the hopper and of the guide structure for the battens, FIG. 12 shows a side rail in a cross-section along XII-XII in FIG. 11, with a batten section and a section of the front wall which guides and retains the objects during their transfer by the conveyor equipped with these battens, FIG. 13 shows, as a cross-section along XIII-XIII in FIG. 12, adjacent portions of battens with their guide means on the tongue of a side rail, FIG. 14 shows an isolated illustration of the guide elements of the battens, meaning the two side rails and the central rail, FIG. 15 shows, on a larger scale than in FIG. 14, the various elements acting as flanges which form the semi-cylindrical guide encasing the conveyor equipped with battens, in the lower portion of the preparation machine, under the hopper, FIG. 16 shows, similarly to FIG. 15, the various elements acting as flanges which form the upper semi-cylindrical guide encasing the conveyor equipped with battens, but also with the gear wheel that drives the endless chain of the conveyor with battens and the drive unit for said conveyor, FIG. 17 shows the propulsion and selection module of the conveying device, said module comprising the guide channel which connects the object feed chute and the rising chute, FIG. 18 is a partial cross-sectional view along XVIII-XVIII of the object feed chute represented in FIG. 17, FIG. 19 is a partial cross-sectional view along XIX-XIX of the guide channel represented in FIG. 17, FIG. 20 illustrates the entrance where the objects enter the guide channel, in interaction with the star wheel of the propulsion and selection module of the conveying device, FIG. 21 is an elevated cross-section of an embodiment of the object propulsion and selection module, during normal operation, FIG. 22 is a view of the lower portion of FIG. 21, showing the operation of the support system which allows selecting and sorting objects in the case of a detected anomaly in an object, FIG. 23 is a view of the lower portion of FIG. 21, showing the operation of the support system in the case of the arrival of a non-compliant object such as an object which has no tamper-evident ring, FIG. 24 is an elevated cross-section of the bistable mechanism which allows pins to retain objects or leave them free in the guide channel, FIG. 25 shows the profile drawing of an object retaining pin, FIG. 26 is a diametrical cross-section of another embodiment of the object propulsion and selection module, FIGS. 27 and 28 show a cross-section of a pin which is part of the variant represented in FIG. 26, respectively illustrating two stable positions of the object retaining pin, FIG. 29 shows a preparation machine according to the invention, comprising several arrangements which improve its operation and facilitate maintenance and/or parts replacement such as replacing battens in case of problems; it also shows an improvement to the device for conveying the objects and in particular for raising them after the object sorting device, FIG. 30 shows the preparation machine from another angle, and specifically the arrangements which allow intervention on the batten belt, in order to change a defective batten for example, FIG. 31 shows a portion of the belt and its guide means at the arrangements which allow removing a defective batten, FIG. 32 shows the cap-piece which ensures continuity in the guide rail for the battens and which, once removed, leaves an opening sufficient to allow the passage of a batten, FIG. 33 shows a section of the cap-piece represented in FIG. 32, FIG. 34 shows a variant embodiment of the batten unloading station represented in FIG. 4, and, in particular, an arrangement of the guiding front surface which prevents the caps or stoppers from advancing beyond this ejection area, FIG. 35 shows a horizontal cross-section of the batten unloading station along XXXV-XXXV in FIG. 34, and specifically the arrangement at the object guiding front surface which prevents their advancing beyond this ejection area.

FIG. 1 shows a perspective view of a preparation machine according to the invention. This machine comprises a hopper 1 which is filled with objects 2, such as caps. The hopper rests on a main chassis 3 which is placed on the ground.

The objects 2 are captured by a conveyor 4 which has the characteristic of comprising a laterally placed endless chain 5, not visible in FIG. 1, onto which is attached a plurality of battens 6, said battens 6 touching each other in the straight portions of said conveyor 4, forming a continuous belt; their attachment to the chain 5 will be detailed further below.

The conveyor 4 with its battens 6 is represented alone in FIG. 2. It extends in an arch between its two ends, these ends being respectively guided on a lower horizontal shaft 7 and an upper shaft 8 which is represented in the vertical position.

The battens 6 are assembled onto the links 9 of the endless chain 5, visible in FIG. 2. This chain 5 will be described below in further detail in connection with the description of the battens 6.

The conveyor 4 comprises an active side 4a, or advancing side, which passes into the hopper 1 and which collects the objects 2, and an inactive side 4b, or return side.

In general, the active and inactive sides are arranged in planes which are substantially vertical and are guided between walls which extend from the chassis 3: a wall 10 which forms the inside of the curve of the conveyor 4 and a wall 11 which covers the outer contour of said conveyor 4. A wall 12 extends vertically between the ends of the walls 10 and 11.

Between the time they are collected from the hopper 1 and the time they are ejected from the battens 6, the objects 2 undergo a selection and sorting operation which is meant to eliminate the incorrectly oriented objects. This operation is achieved by means of a bump 13 arranged above the level of the hopper 1.

This bump 13 unbalances the incorrectly oriented objects 2 by causing a slight pitch motion in the battens 6; the incorrectly oriented objects 2 automatically fall into the hopper 1 and are recycled.

The amount of pitch motion in the battens 6 of the conveyor 4, caused by this bump 13, is adjustable by means of a mechanism 14 which changes the position of the lateral guide devices of said conveyor 4.

One will immediately note in FIGS. 1 and 2 that the objects 2 are collected in horizontal rows by the battens 6 of the conveyor 4, and the lines of objects 2 arranged in these battens 6 are then automatically ejected, by changing them from a horizontal position to a position which is sufficiently inclined to allow this ejection. This change of position results from an angular swinging movement of each of the battens 6, which places them in a fanned-out arrangement and therefore causes them to change from the horizontal position to an inclined position which could even be vertical.

By this movement, the battens 6 are emptied and the objects enter a conveying device 15 which will deliver said objects 2 at the desired height in order to feed them to a capping station, not represented, on a bottling machine for example.

This conveying device 15 is integrally attached to the chassis 3 of the preparation machine by means of the walls 10 to 12 and by means of the hopper 1; it comprises a module 16 which is equipped with propulsion means for the objects 2, said propulsion means making this device 15 into a veritable cap-feeding pump.

However, certain objects, and in particular hollow thermoplastic caps, can remain through the selection operation in the preparation machine and still be advancing although incorrectly oriented and/or not compliant. This is the case for a cap jammed between two properly oriented caps, which can pass beyond the bump, and it is also the case for caps that have lost their ring or have been formed with a defect such as no ring or no hollow, which makes them solid and of course unusable.

To counter these possibilities, the invention proposes, in the propulsion module 16, additional integrated means which consist of a selective support system for the objects 2 and which allow making a complementary selection and sort in order to eliminate these incorrectly oriented stoppers as well as the non-compliant stoppers.

This object 2 propulsion and selection module 16, which will be described in further detail below in relation to FIGS. 17 to 28, is placed between a feed chute 17 and a rising chute 18.

The feed chute 17 is substantially vertical and constitutes a single file passageway which takes the objects 2 as the battens 6 are emptied.

The rising chute 18 transfers and delivers said objects 2 at the desired height in order to feed them to a capping station for example, not represented.

FIG. 3 shows a front view of the preparation machine and the conveying device with is propulsion and selection module. In FIG. 3, note the hopper 1 through which the conveyor 4 equipped with battens 6 is traveling, said battens 6 comprising slots 19 which capture objects 2 as the slots pass through said hopper 1.

This hopper 1 constitutes a loading station 20 where the slots 19 of the battens 6 of the conveyor 4 are filled, said loading station 20 being followed by the selection and sorting station 21 for the objects captured by said slots 19 of the battens 6; this station 21 contains the bump 13 discussed earlier.

Above the selection and sorting station 21, there is a straight portion of the conveyor 4, then a portion which forms a curve, said curved portion constituting the preparation station 22 for the objects 2, where the battens 6 fan out to prepare for discharging the objects.

This preparation station 22 extends to the unloading station 23 for said objects, where said objects 2 leave the slots 19 of the battens 6.

The preparation station 22 extends over a curved section defined by a 90° angle; in this section, the battens 6 assume a fanned-out arrangement and change from a horizontal position to a vertical position.

The lines of objects 2 arranged in the slots 19 of the battens also change from being horizontal to an inclined position which enables, firstly, grouping said objects 2 at the lower end of said slots 19 so as to form a series of objects 2, then, secondly, at the unloading station 23, ejecting said objects 2 due to simple gravity so that they arrive in the receiving and transit area 24 before entering the feed chute 17 of the conveying device 15.

In this manner, an automatic ejection of the objects 2 is obtained without using any means other than gravity, or in other words the series of objects 2 is left to its own in the slot 19 of each batten 6 and it escapes as soon as the conditions of its release are met.

However, note in FIG. 3 that the series of objects 2 forms fairly rapidly starting from the moment the battens 6 begin to be inclined and to swing on an axis perpendicular to the general vertical plane of the active side 4a of the conveyor 4 in its portion located above the selection and sorting station 21.

The battens 6 could therefore also be emptied before they reach the vertical position. This unloading could occur starting at an angle A which could be about 45° for example; at this unloading station 23', to accentuate the action due to gravity, supplemental means could be provided, for example such as an injection of compressed air by means of one or more nozzles 25.

This possibility of choosing the incline of the battens 6 in order to empty them also allows choosing a preparation rate for the objects 2. This rate, which is generally on the order of 30,000 to 60,000 objects per hour, can increase with the incline of said battens 6.

FIG. 4 shows further details of the arrangement of the unloading station 23, specifically an arrangement which allows more or less doubling the rates obtained with a conventional cap feeder of the type described in the above document FR 2 876 991.

The conveyor 4 is guided along its entire path by laterally arranged rails 26 and 27. These guide rails will be described below in more detail. Also, when the battens 6 of the active side 4a of the conveyor 4 move from the horizontal position to the vertical position, the objects 2 are grouped in the lower portion of said battens 6 and they slide on the rail 26 which closes off the lower end of each slot 19; this grouping causes the objects 2 to form a series.

In the final phase of preparation of this series of objects 2, before they reach the unloading station 23, said series of objects 2 is raised, directly in its own slot 19, by means of a ramp 28. This ramp 28 takes over for the rail 26; it forms a shoulder which comes into contact with the lower object 2 which corresponds to the head of the series of objects 2, and this ramp 28 moves said head object 2 away from the lower edge of the batten 6, displacing it and all objects 2 of the same series, within the slot 19.

This ramp 28 forms a sort of spillway and is in the form of a plate which is inserted, as represented in FIG. 5, between the upper surface of the battens 6 and a wall consisting of a panel 29, preferably translucent, which covers the upper portion of the active side 4a of the conveyor 4 between the selection station 21 and the end of the unloading station 23. This panel 29 retains the objects 2 in the slots 19 of said battens 6, from the upper portion of the selection station 21 to the end of the unloading station 23 or to slightly before said end, as represented in FIGS. 34 and 35 which show a variant embodiment.

In this variant, the front panel 29 stops before the end of the unloading station 23 and it is extended out to said end of said station 23 by means of a small panel which forms a flap 291. This flap 291 constitutes an extension which is parallel to the panel 29 and which covers the edge of the end of the panel, and it leaves a slightly larger gap between it and the objects 2 located in the slots 19 of the battens 6.

In fact, the objects 2, such as caps for example, may remain in their slot 19, due to the pressure which may be exerted on said objects 2 by the front panel 29 because of the very small clearance which exists between this panel 29 and said objects 2, and because of possible planarity defects in said panel 29 as well as in the battens 6.

The flap 291 therefore allows introducing an additional gap between it and the objects 2, said gap corresponding to the thickness of the front panel 29, which has the effect of completely freeing said objects 2 from their slot 19 starting at the end of said panel 29. The objects 2 then drop into the receiving and transit area 24 due to simple gravity, or they enter a bypass, which will be further discussed below, and are recycled.

This flap 291 can advantageously be mounted onto the chassis 3 of the machine by means of attaching hinges 292 on a vertical axis, offering easier access to this end area of the unloading station 23, for cleaning and maintenance operations for example.

The flap 291 extends longitudinally for a distance which is, for example, on the order of two or three times the width of the slots 19 of the battens 6; its height corresponds to that of the front panel 29 in this end area of the unloading station. This station 23 is shown in FIG. 3.

Generally, the slots 19 of the battens 6 contain an average of about 5 to 10 objects 2, meaning that said objects 2 occupy about 1/3 to 2/3 of the length of the slots 19.

However, in the upper portion of the unloading station 23, meaning at the upper end of the battens 6, in the rail 27 and the wall 11, an open area 30 can be arranged so as to allow, if the slot 19 happens to be completely full at the exit from the sorting station 21, the removal of the two or three objects 2 which would be in excess due to their rising within said slot 19 because of the ramp 28.

The ramp 28 gives the series of objects 2 a potential energy which can be used to allow this series of objects 2 to gain velocity before it starts to leave its slot 19. This provides a sort of head start to the ejection and an initial velocity which allows decreasing the distance, measured in the direction the conveyor 4 advances, separating the point where the first object 2 leaves its slot 19 from the point where the last object 2 leaves the same slot 19.

To reduce this distance as much as possible, a guide 31 is arranged from the high point of the ramp 28 down to the entrance 32 to the first portion of the chute 17. This guide 31 exhibits a curved parabolic slide surface, which takes into account the speed V at which the conveyor equipped with battens is advancing and the gravitational acceleration. Thus a forward motion is obtained, in the same direction as the advancement of the conveyor 4, for the objects 2 which are at the head of the series. The curve is preferably defined such that each object is slightly offset rearwards, relative to the direction of advancement of the conveyor and relative to the object which directly precedes it.

In this manner, lines of objects 2 are obtained during the unloading of the battens 6, which remain completely in balance and, in particular, which form a column in a more or less vertical alignment, preventing said objects from moving out of their orderly arrangement, particularly the objects at the end of the lines.

The height of the ramp 28 is about twice the width of the slots 19 of the battens 6.

The objects 2 are kept in place in their slots 19 because of the front panel 29 extending longitudinally beyond the guide 31, for a distance of about twice the width of the slots 19 of the battens 6.

When they leave the slot 19 of their batten 6, the objects 2 enter the receiving and transit area 24 which forms a sort of mouth for the chute 17 that takes them next.

Due to the arrangement of the ramp 28 and the guide 31, an ideal organization of the series of objects 2 is observed, as well as a specific orientation of this series at the entrance 32 of the chute 17 which takes and delivers said objects 2 to the conveying device 15. Some objects 2 may be directed towards an overflow which comprises a recycling duct 33. This duct 33 begins at the entrance 32 to the chute 17 and it allows sending to the hopper 1 all the objects 2 which do not successfully enter said chute 17.

Preferably, as represented in FIG. 29, the duct 33 introduces the objects 2 into the loading station, at the mixing chamber 331 located in the lower portion of the conveyor 4, between the conveyor and a wall 332 which delimits the hopper 1 on the conveyor 4 side, isolating the battens 6 of said conveyor 4 relative to the stockpile of objects 2 contained in said hopper 1. This wall 332 extends out in front of the conveyor 4, parallel to its lower portion, at a distance from the conveyor which allows the passage of objects 2 which have not passed over the bump 13 and which allows accommodating the recycled objects coming from the overflow.

The entrance 32 to the chute 17 can be slightly wider than the diameter of the objects 2. This entrance 32 can have a width e, as represented in FIG. 34, which is on the order of 1.5 times the width of the slots 19 of the battens 6, but preferably it corresponds to 1.5 times the diameter of said objects 2.

As an indication, the conveyor 4 equipped with battens 6 advances at a speed on the order of 0.25 meters per second.

FIGS. 6 to 10 show the battens 6 of the conveyor 4 in more detail, particularly their arrangement in order to accept the objects 2 and, above all, to guide them relative to the main chassis 3 of the preparation machine and, notably, relative to the guide rails 26 and 27.

FIG. 6 shows three battens 6 in a fanned-out arrangement, the way they are when level with the preparation station 22. These battens 6 are guided at their ends by rails 26 and 27 which are supported by the chassis 3 and, in particular, by the respective walls 10 and 11. These side rails 26, 27 maintain the battens 6 in their working plane, which for the active portion of the conveyor 4 is a substantially vertical plane.

These battens 6 are also guided by means of a rail 34, said rail 34 being located between the side rails 26 and 27. It acts as a cam to force said battens 6 into a certain orientation, and in particular to cause them to pivot and fan out at the preparation station 22.

FIG. 7 shows a perspective view of a batten 6. This batten 6 is presented in the form of an elongated plate which comprises two slots 19 on its visible face, said slots 19 having a width which is adapted to the size of the objects 2.

This batten 6 comprises guide means at its ends, which cooperate with the side rails 26, 27. These guide means consist of studs 35 arranged at the corners of each batten 6, said studs 35 cooperating, on each side of the batten 6, with a tongue 36 which projects outward from each side rail 26, 27.

These studs 35 are in the form of small cylinders and they are fitted into pockets 37 of corresponding shape arranged in the four corners of the batten 6. The pockets are open at the sides to allow the passage of the tongue 36; said tongue 36 slides into a slot 38 arranged in the shaft of the studs 35.

The studs 35 turn on their axis, within their cylindrical pocket 37, in order to follow the path defined by the corresponding tongue 36; this path can be straight or curved, particularly at the ends of the conveyor 4.

One will note the presence of a cam follower 39 in FIG. 7. This cam follower 39 cooperates with the cam rail 34 and more specifically with one of the two grooves 40 arranged in this rail 34. In fact, each batten comprises two cam followers 39, visible in FIG. 6. Each of these cam followers 39 cooperates with one of the grooves 40 arranged in the rail 34. These cam followers 39 are placed at the edges of the batten 6; they are offset relative to each other in the longitudinal direction of said batten 6, in order to obtain a maximum interaxial distance between two cam followers 39 of a same batten 6 so as to obtain the most precise guidance possible for these battens 6 on the rail 34. This longitudinal offset of the cam followers 39 of a same batten 6 allows placing the followers of two adjacent battens 6 in an overlapping configuration, meaning that the cam follower 39 of one batten 6 partially extends under the adjacent batten 6, and vice-versa.

FIG. 9 shows a cross-section of a batten 6 which is guided at its ends in the rails 26 and 27. These rails are integrally attached to the chassis 3 of the machine 3, similarly to the rail 34.

FIG. 10 is a partial view of the hidden face of a batten 6, showing a portion of the chain 5 which serves to assemble the battens 6 together as well as providing the forward motion for said battens 6. This chain 5 consists of links 9, and the length of each link 9 is on the order of a third of the width of a batten 6. The central link 9 is attached to the batten 6 by means of a pin 41 extending in the lengthwise direction of said batten 6.

The chain 5 is arranged to follow a curve as well, in particular at the preparation station 22. It fits into a hollow 42 arranged under the active surface of the batten 6, said hollow 42 comprising, on the inner side, a curved wall 43 which allows following the movement of the chain 5 when it reaches the curve of the preparation station 22.

To allow the battens 6 to be angled relative to each other, the ends 44 of the battens 6 comprise a lateral beveling on the chain side. This beveling extends from the median longitudinal axis of the chain 5 and it allows the adjacent battens 6 to swing without exerting tension on the chain 5. In fact, in the straight portions of the path of said battens 6, these battens can remain in contact, abutting against one another, to eliminate any risk of objects 2 accidentally becoming wedged between two consecutive battens 6.

FIG. 11 is a cross-sectional side view of the preparation machine. It shows the hopper 1, placed on the chassis 3, and partially represents the conveyor 4 at the hopper, guided by the side rails 27 which support and orient the battens 6 of said conveyor 4, along its entire edge.

In the lower portion, the battens 6 of the conveyor 4 roll on a semi-cylindrical section around the horizontal shaft 7, by means of their guide studs 35 which cooperate with the side rails, rail 26 on the one side and rail 27 on the other.

The bump 13 is located above the upper level of the hopper 1. The curve of this bump is adjusted by means of a screw and nut system 14 which acts directly on the rails 26 and 27. These rails 26 and 27, like the rail 34, are preferably made of thermoplastic material such as acetal.

Between the bump 13 and the upper portion of the chassis 3 is located the panel 29 which maintains the objects 2 in position in the slots 19 of the various battens 6. This panel 29 is visible in FIGS. 11 to 13.

FIG. 12 shows the details of the guidance for the end of a batten 6 on the side rail 27. This side rail 27 is integrally attached to the chassis 3 of the machine and it cooperates, by means of its tongue 36, with the stud 35 which acts as a hinge in its pocket 37 on the batten 6. This batten 6 transports an object 2 held in place by the panel 29, said panel 29, as mentioned above, preferably being a translucent panel.

FIG. 13 shows the objects 2 sandwiched between the slots 19 of the battens 6 and the front panel 29. The battens 6 are guided on the tongue 36 of the rail 27 by means of the studs 35 located at the lateral ends, in the corners, of said battens 6. In FIG. 13, one can see the pocket 37 into which the stud 35 has been inserted; the stud 35 turns in its pocket 37 in order to follow the direction of the tongue 36.

FIG. 14 shows a front view of the side rails 26 and 27 and the central rail 34. These different rails trace a path which, when viewed from the front, is in the form of an arch, and they serve to guide the battens 6 of the conveyor 4. The guide path comprises a first straight and substantially vertical portion which corresponds to the loading station 20 and selection station 21; this first portion is followed by a curved portion which corresponds to the preparation station 22 for the objects 2; and said path ends in a straight horizontal portion which corresponds to the unloading station 23.

The shaft 7 is located at the lower end of the rails 26, 27 and 34, said shaft 7 supporting half-flanges which receive the ends of said rails 26, 27 and 34: the rails of the active side 4a of the conveyor 4 as well as the rails of the inactive side 4b.

Thus, as represented in FIG. 15, the shaft 7 has a flange 34' equipped with grooves 40 to ensure the continuity of the rails 34 and therefore the continuity in the guiding and maintaining of the battens 6 in a specific position and orientation.

The continuity of the rail 26 is ensured by a side flange 26', said flange 26' also comprising the tongue 36 which cooperates with the studs 35. On the other side we find the flange 27' which serves the same function as the flange 26'; this flange 27' extends the rails 27 and it also comprises the tongue 36 for guiding the studs 35.

FIG. 16 shows the arrangement of the vertical shaft 8 constituting the drive shaft for the conveyor 4. The driving means of this conveyor 4 consist of a gear motor 45, said gear motor being integrally attached to the chassis 3 and, in particular, to the wall 10, and it drives a gear wheel 46 which cooperates with the chain 5 on which the various battens 6 are assembled.

On this shaft 8 we find the flanges 26' and 27' which respectively correspond to the extension of the side rails 26 and 27. Also found is the flange 34' which extends the rail 34, and here, too, it also comprises the slots 40 for guiding the cam followers 39 associated with the various battens 6.

As represented in FIG. 17, the object 2 propulsion and selection module 16 comprises an arcing channel 50 which is U-shaped and which extends between the feed chute 17 and the rising chute 18. A star wheel 51 equipped with notches 52 along its edge lies partially within this channel 50 which constitutes a transfer channel between the two chutes 17 and 18.

The notches 52 of the wheel 51 are suitable for individually capturing each of the objects 2 transported by the feed chute 17. The movement of the objects 2 in the transfer channel 50 is associated with the rotation of the wheel 51 and with the presence of the notches 52 which hold each object 2. Thus, each object which is taken hold of by a notch 52 is propelled along the channel 50 and to the upper end of the rising chute 18.

The rising chute 18 preferably consists of segments, not represented, which allow adjusting the height of delivery of the objects 2 according to requirements, as described in the abovementioned document FR 2 876 991.

The feed chute 17, which guides the objects 2, may have a vertical portion extending above the channel 50. The vertical portion of this feed chute 17 guides the objects 2 in single file. Thus the objects 2 delivered by the preparation machine pack them together to form a buffer stockpile upstream from the star wheel 51, at a height which is on the order of about 1 m. The chute 17 acts as an accumulation chute for the objects 2 and as a force-feeding chute for the notched star wheel 51.

When an object 2 is moved along by the star wheel 51, it pushes against the group of objects contained in the rising chute 18. The forward motion given to the objects 2 by the star wheel 51, and the mechanical resistance of each of these objects 2, causes the objects 2 to climb in the rising chute 18 to at least the entrance of the chute feeding the capping station, not represented. The conveying device 15 allows lifting the objects to a significant height in a silent and reliable manner; said device 15, with its star wheel 51, behaves like a pump providing a flow of substantially rigid objects 2.

The feed chute 17, the exit chute 18, the transfer channel 50, and the star wheel 51 are symmetrical relative to the vertical midplane of FIG. 17. The left portion of FIG. 17 is a partial front view; the right portion is a cross-section along 17-17 in FIG. 18.

A back wall 53 extends across the entire width of the module 16, from the force-feeding chute 17 to the rising chute 18, acting as a frame for the entire module 16.

The feed chute 17 and the rising chute 18 each have: an inner side wall 54 and an outer side wall 55; as well as a front wall 56 which extends in front of the force-feeding 17 and rising 18 chutes, parallel to the back wall 53. These chutes 17 and 18 have a rectangular cross-section consisting of the following walls: the back wall 53 and the front wall 56 which are parallel to each other, as well as the side walls 54 and 55 which are also parallel to each other. The cross-section of the chutes 17 and 18 corresponds to the dimensions of a normally shaped object 2.

To manage the operation of the star wheel 51, the feed chute 17 comprises a system for verifying the presence of objects 2, in the form of a sensor 57. This sensor 57 provides its information to a programmable logic controller 58 which controls the entire installation.

The star wheel 51 is driven to rotate about a drive shaft 59. A plurality of pins 60 are also driven to rotate with the star wheel 51. Each pin 60 has the function of accompanying the objects 2 in the channel 50 and to retain each one in the notch 52 which holds it. During its circular travel with the notched wheel 51, each pin 60 moves closer to or moves away from the back wall 53 of the module 16.

The guide channel 50 is delimited by the back wall 53 and by the wall 56 acting as a slide for the objects 2, and this slide only covers the outer peripheral portion of said channel 50 in order to allow the passage of the pins 60. This front wall 56 closes off the channel 50 at the chutes 17 and 18 without covering the entirety of said guide channel 50. This allows each pin 60 to cooperate with an object 2 positioned in the notch 52 which corresponds to said pin 60.

The mechanism for driving the objects 2 and for achieving the axial displacement of the retaining pins 60 will be detailed in FIGS. 21 to 25.

As illustrated in FIGS. 18 and 19, the retaining pin 60 is in a variable position relative to the objects 2 such that each of its ends 61 and 62 are placed in positions which allow it to be active or inactive depending on the case, as detailed below.

In FIG. 18, the pin 60 is represented in a withdrawn position relative to the rim of the object 2; said object 2 has not yet been captured by the corresponding notch 52. However, when the notch 52 grasps the corresponding object 2, FIG. 19, the object is driven translationally along the transfer channel 50. The corresponding retaining pin 60 rests on the rim of the object 2.

As represented in FIG. 17, the module 16 is arranged to provide an arc section A in which the end 61 of the retaining pin 60 enters the hollow of the corresponding object 2 which is correctly oriented. Due to this, within this arc section A the pin 60 verifies the correct orientation and/or compliance of said corresponding object 2.

The outer side wall 55 of the channel 50 is discontinuous for an arc section F which is smaller than the arc section A. In other words, the guide channel 50 has an ejection window 63 located in the lower portion of the module 16. Preferably, the angle of such an ejection arc section F is between 40° and 80°. The angle of the controlled guidance arc section A is larger than that of the ejection arc section F; it extends to each side of the ejection arc section F for an additional angle sufficient to give the pins 60 the time to enter into the hollow of the corresponding object 2; this arc section defines, for example, an angle of between 90° and 180°.

In other words, when an object 2 traveling along the channel 50 is opposite the ejection window 63, it is no longer guided by the outer side wall 55 but is only held by the corresponding retaining pin 60. If the object 2 is incorrectly oriented, it is then possible to retract the retaining pin 60 so that this defective object 2 falls through the ejection window 63 due to its own weight, into a collection bin 64 placed on the ground for example.

The pin 60 serves to detect defects and also serves as a remedy when a defect is detected. This pin 60 is therefore both a defect detection sensor and a retractable retaining means.

Using FIG. 20, the entrance to the channel 50 and the synchronization between the rotation of the notched 52 star wheel 51 and the arrival of the objects 2 will now be described. To prevent an object 2 from becoming stuck at the entrance, the invention proposes a simple synchronization means consisting of guaranteeing that the objects 2 located in the entrance area of the channel 50 are systematically incorporated into a line of objects 2 in successive contact with one another. The continuous line of objects, extending from an object 2 already captured by a notch 52 to one or more objects 2 located in an end portion of the feed chute 17, forms a buffer stockpile S.

The position of the object 2 as it follows the guide channel 50 is completely determined by the notch 52 which holds it. In other words, at the moment of its arrival in the channel 50, each object 2 is held, with no risk of becoming stuck, between its contact with the tooth of the notch 52, its contact with the outer side wall 55, and its contact with the next object 2.

In the example illustrated in FIG. 20, the end portion of the feed chute 17 extends vertically above the object 2 already captured by the notch 52, such that the entire weight of the objects 2 in the buffer stockpile is also supported by said notch 52. The objects 2 in the feed chute 17 to the channel 50 thus have their position synchronized with the rotation of the star wheel 51.

A buffer stockpile is maintained in the feed chute 17, under the control of the sensor or sensors 57, to a height S of about 1 m.

Alternatively, the end portion of the feed chute 17 as well as the entrance area of the channel 50 could simply be inclined relative to the horizontal.

To better control the position of the objects 2 in the entrance area of the channel 50, the inner side wall 54 extends behind the star wheel 51 sufficiently to ensure that the object 2 it is guiding is completely retained by a notch 52.

FIGS. 21 to 25 show further details of the object 2 selection and sorting system.

The drive shaft 59 of the star wheel 51 is located in the plane of symmetry of the module 16 and it is angled relative to the normal of the back wall 53 by an angle of between 1° and 10° and preferably between 2° and 5°. The tilt angle of the drive shaft 59 is oriented towards both the front and the bottom of the module 16.

In the transfer channel 50, each object 2 slides axially in its notch 52 between the moment when said notch takes charge of it at the lower end of the feed chute 17 and the moment when it passes in front of the ejection window 63, and it then slides in the other direction until the moment its notch 52 releases it into the rising chute 18.

The propulsion and selection module 16 comprises a mechanism for driving the retaining pins 60. This driving mechanism consists of:

a driving motor 65 which is integrally attached to the back wall 53, and, a flange 66 which is attached at a distance from the star wheel 51, to the drive shaft 59.

The motor 65 is controlled by the programmable logic controller 58, taking into account the information provided by the control system and in particular by the sensor or sensors 57 which monitor the level of objects 2 in the feed chute 17.

The various retaining pins 60 are supported by the flange 66 and are guided translationally in a direction parallel to the drive shaft 59. These pins 60 are distributed all around the star wheel 51 so that they are opposite each of said notches 52.

For each retaining pin 60, the flange 66 is equipped with a bistable spring 67 mechanism, said spring pushing the retaining pin 60 either into a stable active position for retaining objects 2 in which the end 61 of said pin 60 is positioned towards the back of the module 16, as illustrated in FIG. 21, or into a stable inactive position, illustrated in FIG. 22, where the end 62 of said pin 60 is positioned towards the front part of said module 16.

Each of the pins 60 comprises a retaining end 61, located near the back wall 53, that is able to enter the hollow of a correctly oriented object 2 while said retaining pin 60 is within the retaining arc section A, illustrated in FIG. 17.

The set of active ends 61 of the retaining pins 60 defines a circle of reference which is coaxial to the drive shaft 59. This circle of reference intersects the slide surface of the front wall 56 of the channel 50 at a line which is located above the level of the ejection window 63, and this line defines the arc section A in which the objects 2 are retained and guided due to the action of the pins 60.

As illustrated in FIG. 22, an incorrectly oriented object 2 pushes the pin 60 towards the front of the device 15 (which is towards the left in FIG. 22). The bistable spring 67 mechanism, which comes between the flange 66 and the pin 60, automatically drives said corresponding retaining pin 60 towards a second stable, but inactive, position. In the stable inactive position, the active end 61 of the retaining pin 60 is no longer pressing against the bottom of the defective object 2 and this defective object 2 then falls, due to the effect of its own weight, and passes through the ejection window 63.

An inability to access the hollow area of the object 2 may also result from another type of defect, such as a plastic film partially or completely covering said hollow area of said object 2. The defective object 2 may also, as represented in FIG. 23, be a cap without its tamper-evident ring or be a solid object resulting from molding without the mandrel. In other words, the sorting means allows testing for the existence of a correctly oriented hollow area for each object 2.

The sorting means provides a supplemental sort criterion that is distinct from the criterion applied by the preparation machine where the sort criterion is exclusively dependent on the position of the center of gravity of the objects 2. The successive combination of sort mechanisms according to different and complementary sort criteria greatly reduces the breakdowns in capping machines due to cap feed failures.

The retaining pins 60 each have a second end 62, opposite the end 61, said end 62 being located at the forward side, or front side, of the module 16. When the retaining pin 60 is in the stable active position, as illustrated in FIG. 21, the end 62 moves along a second circle of reference. When the pin 60 is in the stable inactive position, illustrated in FIG. 22, meaning when it is advanced towards the front of the module 16, the circle of these ends 62 is displaced towards the front of the module 16.

The sorting means also comprise a reset cam 68 able to return the retaining pins 60 located outside the angular area of the ejection window 63, from the stable inactive position illustrated in FIG. 22 to the stable active position illustrated in FIG. 21.

The reset cam 68 is in the form of a disk which is parallel to the plane of the back wall 53 of the guide channel 50. The reset cam 68 rotates on a shaft 69 that is integrally attached to the back wall 53, and this shaft 69 passes through the center of the circle of reference of the ends 62 of the pins 60. This circle of reference of the ends 62, when the pins 60 are in the active position of retaining the objects 2, is substantially distanced from, and, in a limit position possibly even tangential to, the reset cam 68. But when a retaining pin 60 has swung into the second stable, inactive, position due to a defective object 2, the circle of reference of the end 62 of this retracted pin 60 intersects the plane of the cam 68 and said retracted pin is progressively brought to its active position. The pressure from a retracted pin 60 is sufficient to rotate the reset cam 68. Such a reset cam 68 has the advantage of not generating any friction as it returns the retaining pin 60 to its stable active position.

As illustrated in FIG. 25, each of the retaining pins 60 forms a symmetrical cylinder around its axis. The pin 60 has a first ball bearing face 71 and a second ball bearing face 72, each one toroidal in shape and coaxial to the axis of said pin 60. The inside diameter of the second toroidal face 72 is less than the inside diameter of the first toroidal face 71.

A conical connecting surface 73 is tangential to the second toroidal face 72 and presents a connecting edge 74 with the first toroidal face 71. The connecting edge 74 has a diameter slightly greater than the diameter of the bottom of the first toroidal face 71. The spring mechanism 67 pushes a ball 75 to the bottom of the first toroidal face 71. This position corresponds to the stable active position of the pin 60; this position is stable due to the slight lip presented by the connecting edge 74. In this stable position, the ball 75 is positioned in a plane 71a which is perpendicular to the axis of the pin 60. Similarly, in the stable inactive position, the ball 75 is positioned in a plane 72i which is perpendicular to the axis of the pin 60, and the distance between the two planes 71a and 72i corresponds to the stroke C of said pin 60 between its two stable positions.

The circular connecting edge 74 is located in a plane between the planes 71a and 72i, at a distance from the plane 71a of the first ball bearing face 71 of between 0.25 and 1.2 mm, and preferably between 0.5 and 1 mm. The stroke C is on the order of 4 mm.

When a defective object 2 pushes the end 61 of the pin 60 for an axial distance greater than said distance between the connecting edge 74 and the plane 71a, the ball rolls along the conical surface 73 and pulls said retaining pin 60 towards the left of FIG. 25, until said ball 75 falls to the bottom of the second toroidal face 72.

For the reset, the cam 68 pushes the end 62 of the retaining pin 60 over an axial distance greater than the distance between the bottom of the second face 72 and the connecting edge 74. The ball 75 then compresses the spring mechanism 67 and, when the lip represented by the connecting edge 74 is exceeded, the ball 75 falls back to the bottom of the first toroidal face 71 and the first stable position of the retaining pin 60 is restored.

The lip formed by the connecting edge 74 has a slope 76, on the side of the first toroidal face 71, that forms an angle of only a few degrees. For example, the slope 76 forms an angle of between 1° and 10° and preferably between 4° and 6°. Thus, the retaining pin 60 and the spring mechanism 67 constitute an asymmetric bistable position detector requiring very little effort to trigger. A simple film partially covering the hollow of an object 2 is sufficient to push the end 61 of the pin 60, with little force being needed for the ball 75 to climb the slope 76 and said pin 60 to swing into the stable inactive position where the ball 75 is at the bottom of the second bearing face 72. Such a cam mechanism is sensitive to reduced forces and is therefore sensitive to minor defects in the objects 2, in spite of very high speeds in the selection and conveying device 15.

FIG. 21 also schematically shows an arrangement of the lower portion of the back wall 53 which allows emptying the channel 50, and in particular the removal of objects retained by the pins 60 and, possibly, objects in the feed and rising chutes.

The back wall 53 comprises a panel 77 which can move; this panel 77 is, for example, assembled to swing on a hinge 78 and is actuated by an appropriate actuating means such as a simple screw 79 which is inserted between said panel 77 and a tab 80 integrally attached to said back wall 53.

A propulsion and selection module 16 will now be described with reference to FIGS. 26 to 28. It only differs from the previously described module by the manner in which the retaining pins 60 are moved, either towards a first stable active position or towards a second stable inactive position of object 2 retention.

A flange 66' for guiding the pins 60 consists of two coaxial disks 82, 83 of magnetic material. The motor 65 rotates, on the shaft 59, a unit assembly successively comprising along said shaft 59: the star wheel 51, the disk 82, and then the disk 83. The disks 82, 83 extend radially and are spaced apart from each other by a constant interaxial distance E.

The retaining pins 60 are distributed around the shaft 59 in the same manner as the pins 60 in the module 16 illustrated in FIG. 17. Each retaining pin 60 is in the form of a rod 85 of non-magnetic material, such as stainless steel, said rod 85 sliding translationally in two boreholes in alignment with each other, one located in disk 82 and the other in disk 83. Thus, the rod 85 is free to move translationally in a direction perpendicular to the disks 82, 83.

Each of the retaining pins 60 also comprises a permanent magnet 86 in the form of a ring surrounding the rod 85, and a spacer 87 of synthetic material. The spacer 87 comprises a radial wall 88 that fits over the rod 85 and a skirt 89 that surrounds the permanent magnet 86. The permanent magnet 86 is attached to the rod 85, sandwiched between a stop 90 on the rod 85 and the radial wall 88 of the spacer. The magnet 86 and the spacer 87 are arranged between the two disks 82, 83.

The pin 60 formed by the rod 85, the magnet 86, and the spacer 87, forms a unit assembly which floats translationally between the two disks 82, 83. The first stable active position of the pin 60 is such that end 61 of said pin 60 is positioned, as before, on one circle of reference, and end 62 of said pin 60 is positioned on the other circle of reference.

In addition, the permanent magnet 86 is closer to disk 82 than to disk 83, and is located at a minimal distance D from the disk 82 that is equal to the thickness of the radial wall 88.

When a defective object 2 pushes the end 61 of the pin 60 beyond a neutral position "n" of the pin 60, where the permanent magnet 86 is at an equal distance from the disks 82 and 83, the retaining pin 60 is then pulled into its second stable inactive position.

In its second stable inactive position, the magnet 86 is closer to disk 83 than to disk 82. The end 62 of the retaining pin 60 is positioned on the outer circle. In addition, the magnet 86 is located at a minimal distance d from the disk 83, which corresponds to the axial protrusion of the skirt 89 beyond the magnet 86. Alternatively, the minimal distance d could also be determined by a stop arranged on the rod 85.

Advantageously, the minimal distance d corresponding to the second stable inactive position is less than the minimal distance D corresponding to the first stable position. This allows guaranteeing a force for disengaging the pin 60 that is as weak as desired for detecting an incorrect orientation of the object 2. However, the force for maintaining the pin 60 in the second stable inactive position is sufficiently high to prevent vibrations due to high speeds in the preparation machine from inadvertently reengaging said pin 60.

The module 16 also comprises a reset cam 68' which may be in the form of a disk as presented above in FIG. 21 or, as represented in FIG. 26, in the form of a half-crown extending parallel to the guide channel 50. This half-crown cam 68' is attached by a foot 91 to the back wall 53 of the device 15.

Alternatively, any means for attaching the reset cam 68' is appropriate as long as said cam presents a surface which the ends 62 of the pins 60 can press against when said pins 60 are in a stable inactive position. The support surface of the reset cam 68' extends parallel to the back wall 53 of the transfer channel 50.

Thus, the ends 62 of the pins 60 which had been engaged are returned from the inactive position on the outer circle, to a position on the rear circle of reference. It is sufficient for the cam 68' to push against the end 62, such that the mid plane of the permanent magnet 86 moves from the second stable inactive position to at least the neutral position "n". The attraction of the permanent magnet 86 by the disk 82 then prevails and draws the entire retaining pin 60 assembly into the first stable active position where the objects 2 are retained.

FIGS. 29 to 32 show, on the sides of the machine, an arrangement which allows accessing the battens 6 of the conveyor 4 in order to correct a problem in these battens without having to disassemble the entire machine. The battens 6 are guided at each of their ends on the tongue 36 of the continuous rails 26, 27 which are integrally attached to the chassis 3 of the machine and, in particular, to the wall 10 which forms the inside of the curve of the conveyor 4 and of the wall 11 which covers the outer contour of said conveyor.

Note the plate 96 in FIG. 29, attached to the wall 10. There is an identical plate 96 in FIG. 30, but it is removed to allow the passage of a batten 6. These plates 96 each cover a window 97 that opens onto the rails 26, 27 serving to guide the inactive side of the conveyor 4. In addition, these plates 96 are positioned at the level of a panel 98 located on the rear wall 99 of the machine, said panel 98 making it possible to uncover and access a portion of the inactive side of the conveyor 4.

In FIG. 30, the batten 6 is represented partially, in an extraction position, after removal of the plate 96; it can be extracted from the inside of the machine after detaching it from the drive chain 5 by removing the pin 41 which connects them together.

FIG. 31 shows further details of the rail 26 with its main tongue 36 for guiding the batten 6; the guidance is the same as on the rail 27. In this FIG. 31, one can also see the plate 96 ensuring the continuity in the guidance of the batten 6 on the rail 26 or 27, when said batten passes in front of the window 97.

As represented also in FIGS. 32 and 33, the plate 96 includes a portion which acts as a cover; this cover 100 is precisely positioned and held in place in the window 97, and visibly projecting from this cover 100 and facing towards the inside of the machine is a portion of the tongue 36' which acts as a substitute tongue; this substitute tongue 36' is positioned so as to extend the ends of the main tongue 36 of the corresponding rail 26 or 27, because said main tongue 36 stops at each window 97. The height and width of the window 97 correspond to at least the dimensions of the cross-section of the batten 6 casing.

FIGS. 29 and 30 also show an arrangement of the object 2 conveying device 15, in particular in the rising chute 18 which leads to a chute feeding a capping station, for example. This arrangement aims to reduce the friction between the objects 2 and at least one of the walls of the chute 18 in which said objects 2 are lifted.

As is schematically represented in the figures, an endless belt 101 extending between two pulleys 102 and 103 spaced vertically apart, acts as a moving wall for the rising chute 18; this belt 101 travels at a speed that is on the same order as the speed at which the objects 2 advance in said rising chute 18; preferably, the speed at which the belt 101 moves is substantially greater, by about 5 percent, to said speed at which said objects 2 advance, in said rising chute 18.

The invention claimed is:

1. A method for preparing capping objects aligned in slots of battens of an endless conveyor of a sealing element preparation machine, comprising the steps consisting of modifying, by means of said battens, the position of rows of objects taken in said slots so as to cause said rows to successively move from a horizontal position to a position that is sufficiently inclined to cause unloading of said slots due to gravity, sending said objects towards a receiving and transit area where said objects enter, single file, into a chute of a conveying device.

2. The method for preparing objects, according to claim 1, comprising a step of unloading said slots of said battens by applying a combination of means comprising, in addition to gravity, a propulsion of said objects by jet(s) of compressed air.

3. The method for preparing objects, according to claim 1, further comprising a preparation step of preparing objects aligned in each slot of said battens prior to unloading said objects from said each slot, said preparation step consisting of moving a corresponding row of objects upwards, in said each slot, so as to establish a head start to the ejection, said head start allowing said corresponding row of objects to begin to assume velocity, due to gravity, before exiting the corresponding slot.

4. The method for preparing objects, according to claim 1, comprising the steps consisting of:
   gathering into a single line said objects coming from a batten unloading station, in a first portion of a feed chute that delivers said objects to said conveying device, in order to force feed said conveying device,
   in a lower portion of said feed chute, passing control of said objects to a propulsion system including a star wheel with notches, arranged in a U-shaped semi-circular channel,
   raising said objects in a second chute portion, referred to as a rising chute, to above a level of said receiving and transit area, in order to deliver said objects to an entrance to a further chute feeding a capping station.

5. The method for preparing objects, according to claim 4, further comprising the step consisting of carrying out a complementary operation of selecting, checking, and sorting said objects at said propulsion module, in order to eliminate objects which are non-compliant or still incorrectly oriented, said complementary operation consisting of using, during a passage of said objects in a guide channel of said propulsion module, means associated with said star wheel in order to:
—maintain correctly oriented and compliant objects in respective notches of said star wheel during the time said notches pass in front of an ejection window arranged in a lower portion of said guide channel, or —abandon incorrectly oriented or non-compliant objects in front of said window where these incorrectly oriented or non-compliant objects are discharged automatically.

6. A sealing element preparation machine having an endless conveyor comprising battens in which slots are intended to contain objects that are stoppers, caps, or similar objects, comprising, in order to prepare said objects:
- a loading station for loading said slots with objects, said loading station comprising a hopper which is supported by a chassis and which contains said objects to be prepared,
- a selecting station for selecting and sorting said objects, said selecting station being installed above said hopper in order to eliminate objects being at least one of incorrectly positioned and incorrectly oriented objects in said slots,
- a preparation station for successively preparing said objects in each slot into a compact series or objects in said slot,
- an unloading station for successively unloading said slots, said unloading station comprising a receiving and transit area where said series of objects is directed towards a feed chute of a conveying device, and a conveyance system consisting of:
- said endless conveyor with battens, which comprises an endless chain extending between two shafts, said battens being attached to said chain, and said chain being able to curve in a plane passing through an axis of chain links,
- driving means for driving said chain so that an active side of said conveyor successively travels into said hopper, then to the selecting station, and lastly to the unloading station,
- an arching path supported by said chassis and which can be broken down into several portions on a side of an active object collection part, including: —a first straight rising portion which extends from said loading station to a level located above said selecting station, and —a curving planar portion in which said battens swing and fan out in order to bring together and add load to each series of objects to prepare said objects for gravitational ejection at said unloading station, said path consisting of side rails that are extended, at said shafts located at ends of said endless chain, by flanges respectively ensuring continuity of said side rails, said side rails and flanges cooperating with each batten in order to guide and orient said batten along an entire length of said path.

7. The preparation machine according to claim 6, comprising two combined unloading means which are unloading means that make use of gravity, and additional unloading means that use air jets aimed in a same direction as said slots.

8. The preparation machine according to claim 6, wherein said endless conveyor comprises, at said unloading station, a second straight portion at the end of said curving planar portion, said second straight portion extending horizontally in a substantially vertical plane at said unloading station, in order to vertically orient said slots of said battens, opposite said receiving and transit area where object unloading occurs.

9. The preparation machine according to claim 6, wherein means for guiding and orienting said battens comprise:
- side rails arranged at sides of said chassis in order to establish a surface on which said battens travel and to control a batten pitch motion, said battens comprising guide elements arranged at batten ends that cooperate with said side rails, and,
- a rail acting as a cam in order to control an angular orientation of said battens relative to each other, said battens comprising at least one pair of cam followers which are guided by grooves in said cam rail in order to adapt an orientation of said battens according to said battens position on said arching path and cause said battens to assume a horizontal position at said loading station and at said selecting station, and a substantially vertical position at said unloading station with, between said horizontal position and substantially vertical position, an evolving fanned-out position at said preparation station that prepares for the unloading of said battens.

10. The preparation machine according to claim 6, comprising means for preparing for said unloading operation, said means being arranged upstream from said receiving and transit area and consisting of a ramp-like arrangement, forming a shoulder which acts as a guide and ends in a spillway, said ramp-like arrangement being placed between said battens and a front panel that retains the caps arranged within said slots of said battens, said ramp-like arrangement raising said objects in each slot by a height which substantially corresponds to twice the width of a slot.

11. The preparation machine according to claim 6, wherein said battens are in the form of rectangular plates, each plate being equipped, on a visible face, with at least one slot for capturing objects and, on an hidden face, perpendicularly to said at least one slot, said plate comprises a recess which is arranged to house said endless chain, said recess comprising, on a side of a small radius of curvature of said preparation station, a curved edge with a radius substantially corresponding to a mean radius of curvature of said endless chain at said preparation station, said endless chain comprising links of a length on the order of a third of the width of said batten and said endless chain being integrally attached to each batten by means of a pin extending between edges of said recess and passing through a central link of a portion of endless chain located within said recess.

12. The preparation machine according to claim 11, wherein each of said battens has corners each of which comprises guide means for cooperating with said side rails integrally attached to said chassis and for following said arching path imposed by said side rails of which certain parts are straight and other parts are curved, either within a plane, or over a cylinder section, said guide means comprising pockets arranged in said corners of said battens, for positioning guide elements in the form of studs made of thermoplastic material, said studs being cylindrical in shape and centered on an axis parallel to a longitudinal axis of a corresponding batten, in order to be able to pivot in a pocket, and said studs comprising a slot into which an active portion of a corresponding guiding side rail fits, said active portion being in the form of a continuous tongue.

13. The preparation machine according to claim 6, comprising a feed chute which receives said objects, an entrance of said feed chute being placed at said unloading station, in said receiving and transit area for said objects, said entrance being of a size less than or equal to 1.5 times the width of said slot of said battens, and said entrance is located at a lower end of a guide of said receiving and transit area, said receiving and transit area comprising a bypass channel for recycling any object that miss said entrance.

14. The preparation machine according to claim 6, wherein said conveying device for conveying said objects exiting said unloading station consists of: —a feed chute for receiving and delivering said objects, which acts as an accumulator downstream from said unloading station, —a rising chute which extends to an entrance to a further chute feeding a capping station, and, between said feed and rising chutes, —a propulsion module which comprises a U-shaped semicircular guide channel, said guide channel establishing a connection between said feed and rising chutes and partially enveloping a star wheel with notches which propels said objects into said rising chute.

15. The preparation machine according to claim 14, wherein said propulsion module has, in said guide channel, two arc sections which continuously guide said objects and, between said two arc section, an open arc section forming an ejection window, which allows conducting an additional selection and sorting operation on said objects, said propulsion module becoming a propulsion and selection module and comprising complementary means for selecting said objects, said complementary means consisting of a support system for said objects which is organized to retain compliant and properly oriented objects in said guide channel and to release non-compliant or improperly oriented objects at said ejection window, said complementary means being located at said guide channel in which said star wheel is housed.

16. The preparation machine according to claim 15, wherein said support system for the objects comprises a plurality of pins arranged opposite each notch of said star wheel, each pin being movable between two stable positions: —a first stable position in which said pin is placed in a hollow of an object held within a corresponding notch, in order to maintain said object in said corresponding notch as said corresponding notch passes in front of said ejection window, and —a second stable position which results from a backwards movement of said pin caused by an obstacle or by contact with an improperly oriented object which prevents said pin from entering said hollow of said object.

17. The preparation machine according to claim 16, wherein said propulsion and selection module comprises:

a motor that drives said star wheel,
a flange arranged at a distance from said star wheel, integrally attached to a drive shaft of said star wheel,
pins corresponding to each notch, said pins being mounted on said flange in a manner such that all retaining ends of said pins are positioned along a circle of reference which is coaxial to said drive shaft of said star wheel.

18. The preparation machine according to claim 16, wherein said propulsion and selection module comprises, at said star wheel, two parallel coaxial disks of magnetic material, at least one of said disks acting as a guide for said object retaining pins, said pins each consisting of a rod of non-magnetic material and said pins being mounted to freely move translationally within at least one of said disks, in an axial direction, and a permanent magnet attached to said rod of each pin, allowing said pin to float between said disks, between a stable active position which retains said objects and a stable inactive position which leaves the objects free during passage of said objects in front of said ejection window.

19. The preparation machine according to claim 16, wherein said propulsion and selection module comprises a reset cam for said pins, said reset cam being able to return said pins, when said pins are located outside said ejection window, from an inactive retaining position to an active retaining position for the objects.

20. The preparation machine according to claim 14, comprising, at said conveying device and at said rising chute extending to a further chute feeding a capping station, an endless belt extending between two pulleys spaced vertically apart, said endless belt acting as a moving wall for said rising chute and traveling at a travel speed that is on the same order as the speed at which the objects advance in said rising chute.

* * * * *